US008333397B2

(12) United States Patent
Trout

(10) Patent No.: US 8,333,397 B2
(45) Date of Patent: *Dec. 18, 2012

(54) VEHICLE STABILIZATION APPARATUS AND VEHICLE FORMED THEREWITH

(75) Inventor: William G. Trout, Elgin, IL (US)

(73) Assignee: Steelhead Innovations, LLC, Elgin, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,705

(22) Filed: Mar. 5, 2012

(65) Prior Publication Data

US 2012/0161421 A1    Jun. 28, 2012

Related U.S. Application Data

(63) Continuation of application No. 13/087,893, filed on Apr. 15, 2011, now Pat. No. 8,128,114, which is a continuation of application No. 12/694,904, filed on Jan. 27, 2010, now Pat. No. 7,938,426, which is a continuation-in-part of application No. 12/543,892, filed on Aug. 19, 2009, now abandoned.

(60) Provisional application No. 61/189,553, filed on Aug. 20, 2008.

(51) Int. Cl.
*B62H 1/02* (2006.01)
*B62H 7/00* (2006.01)

(52) U.S. Cl. ................ 280/293; 280/301; 280/303

(58) Field of Classification Search .......... 180/209; 280/288.4, 293, 294, 295, 298, 299, 300, 280/301, 302, 303, 304

See application file for complete search history.

(56) References Cited

U.S. PATENT DOCUMENTS

| | | | |
|---|---|---|---|
| 476,297 A | 6/1892 | Overs | |
| 617,136 A | 1/1899 | Wilkins et al. | |
| 625,574 A | 5/1899 | Locke | |
| 708,809 A | 9/1902 | Hayes | |
| 720,860 A | 2/1903 | Trutzschler | |
| 1,576,133 A | 3/1926 | Chisar | |
| 2,301,036 A | 11/1942 | Gray | |
| 2,535,283 A | 12/1950 | Groom | |
| 4,203,500 A | 5/1980 | Kamiya | |
| 4,815,756 A | 3/1989 | Kitner | |
| 5,064,213 A | 11/1991 | Storch | |
| 5,169,165 A | 12/1992 | Oates | |
| 6,113,122 A | 9/2000 | Plana | |
| 6,286,849 B1 | 9/2001 | Slattery | |
| 6,296,266 B1 | 10/2001 | Martin | |
| 6,318,745 B1 | 11/2001 | Sharp, III | |

(Continued)

*Primary Examiner* — Lesley D Morris
*Assistant Examiner* — Marc A Scharich
(74) *Attorney, Agent, or Firm* — Parsons & Goltry; Michael W. Goltry; Robert A. Parsons

(57) ABSTRACT

A vehicle assembly includes a two-wheeled vehicle including a frame having opposed sides, opposed front and rear ends, and a front wheel mounted for rotation to the frame proximate to the front end of the frame positioned in front of an opposed rear wheel mounted for rotation to the frame proximate to the rear end of the frame and that is substantially in-line with respect to the front wheel. A member is carried by the frame of the vehicle between the front and rear wheels and has end portions disposed adjacent to the respective sides of the frame. A wheeled stabilizer assembly is carried by each of the end portions of the member to wheelingly interact with the ground over which the vehicle is driven along the sides of the frame proximate to the front and rear wheels of the vehicle.

10 Claims, 13 Drawing Sheets

U.S. PATENT DOCUMENTS

| | | |
|---|---|---|
| 6,974,145 B1 | 12/2005 | Peters |
| 6,994,368 B2 | 2/2006 | Brown |
| 7,032,916 B2 | 4/2006 | Plana |
| 8,128,114 B2 * | 3/2012 | Trout .......................... 280/293 |
| 2008/0023415 A1 | 1/2008 | Zuckerman |
| 2008/0029994 A1 | 2/2008 | Lytle |
| 2008/0164676 A1 | 7/2008 | Bell |

* cited by examiner

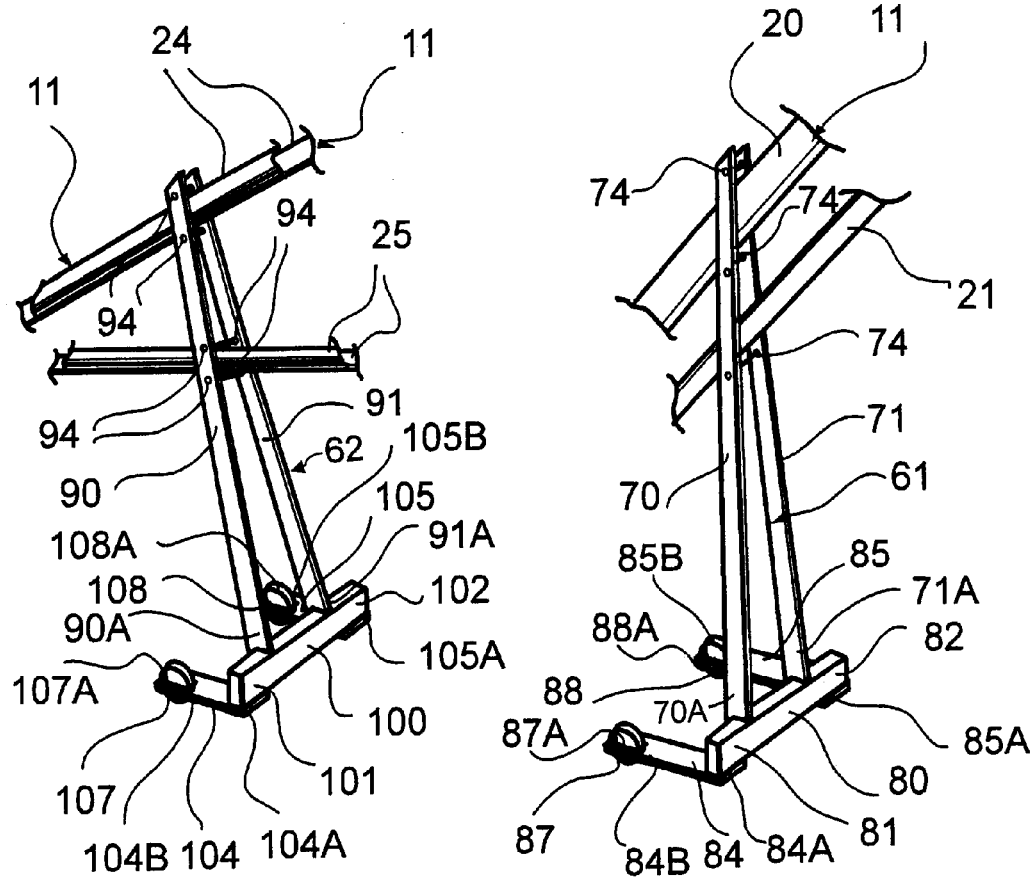

FIG. 8
FIG. 3
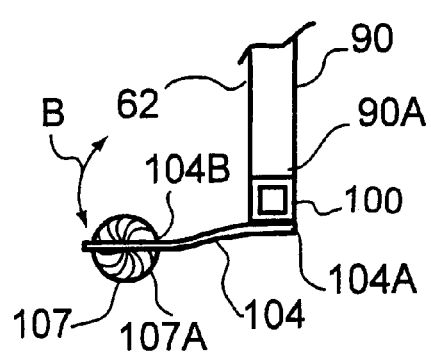
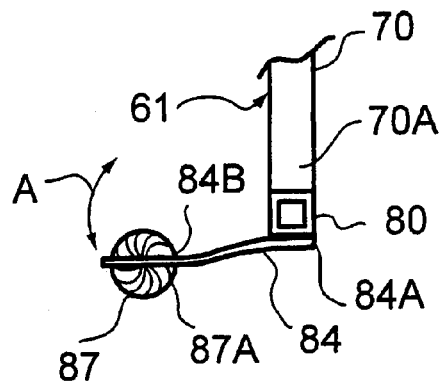
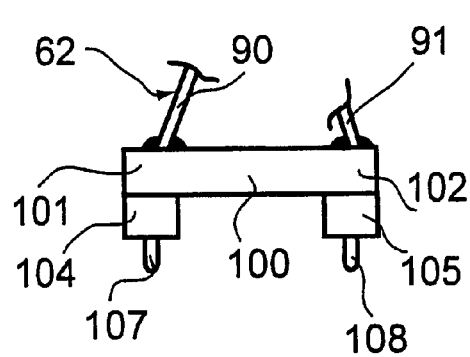
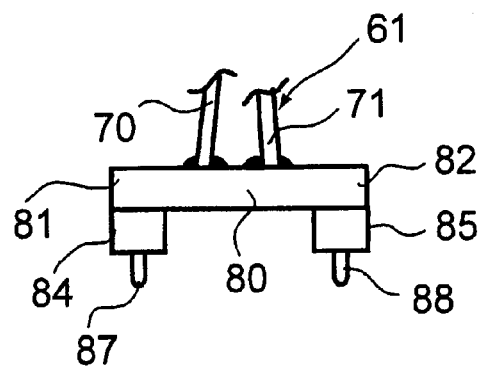
FIG. 9
FIG. 4

FIG. 10
FIG. 5
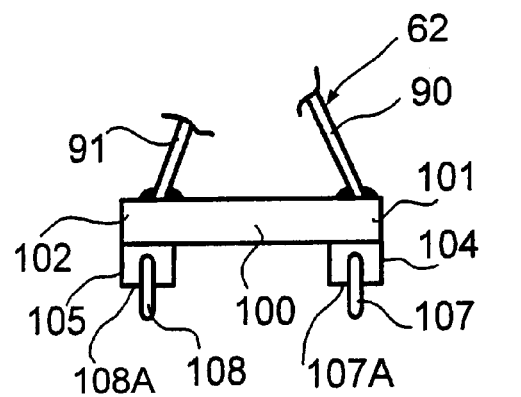
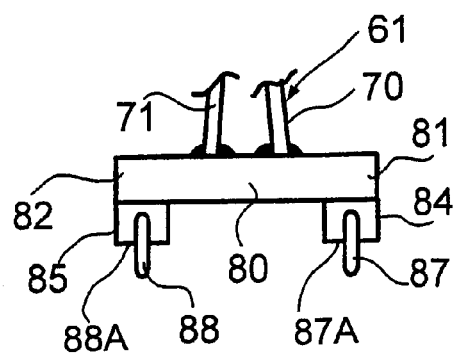
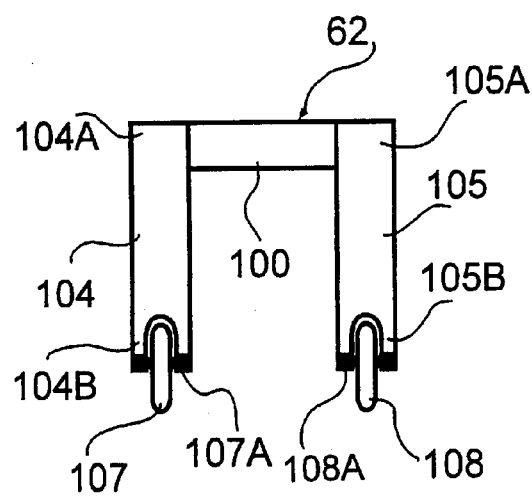
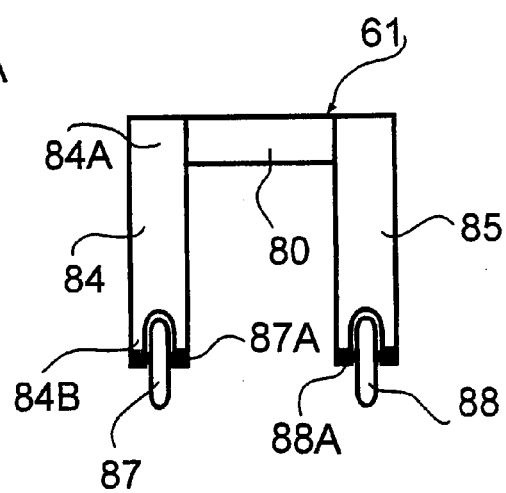
FIG. 11
FIG. 6

FIG. 12
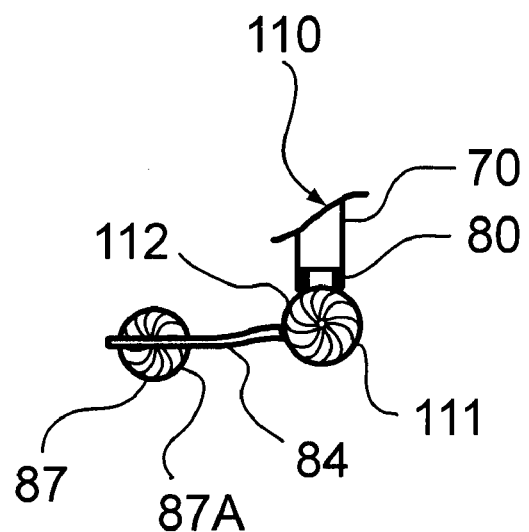
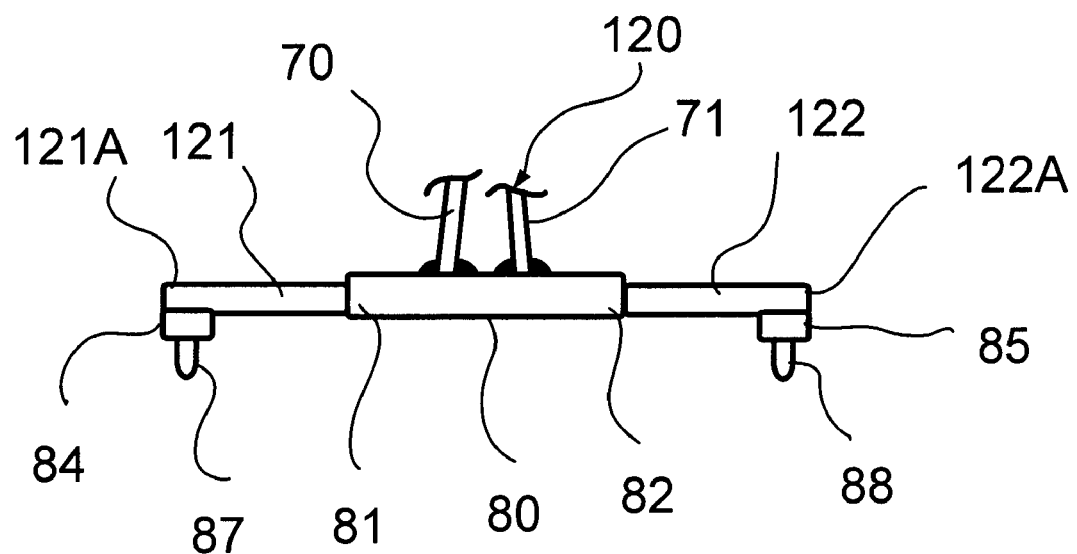
FIG. 13

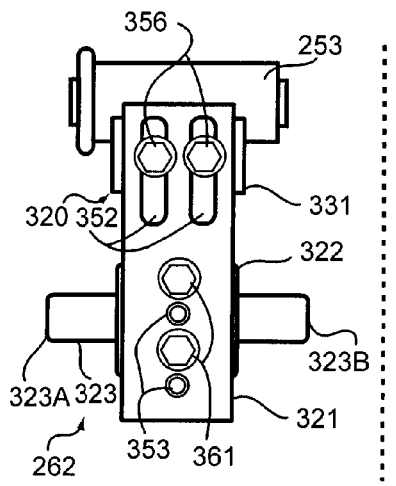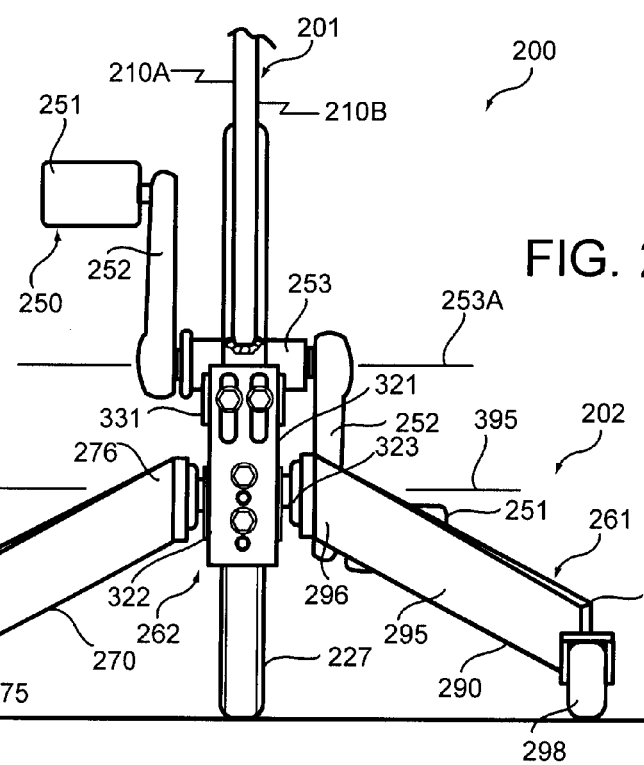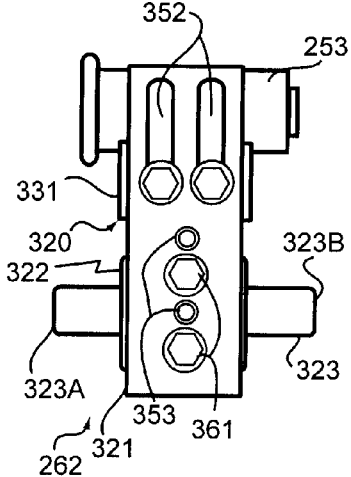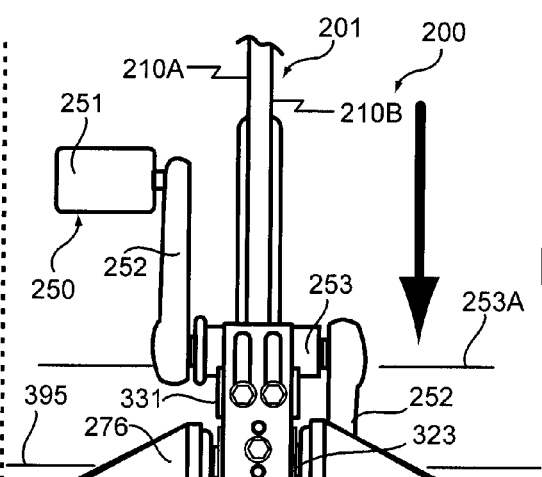

VEHICLE STABILIZATION APPARATUS AND VEHICLE FORMED THEREWITH

CROSS REFERENCE TO RELATED APPLICATION

This application is a continuation of U.S. patent application Ser. No. 13/087,893, filed Apr. 15, 2011, now U.S. Pat. No. 8,128,114, which is a continuation of U.S. patent application Ser. No. 12/694,904, filed Jan. 27, 2010, now U.S. Pat. No. 7,938,426, which is a continuation-in-part of U.S. patent application Ser. No. 12/543,892, filed Aug. 19, 2009 now abandoned, which, in turn, claims the benefit of U.S. Provisional patent application Ser. No. 61/189,553, filed Aug. 20, 2008.

FIELD OF THE INVENTION

The present invention relates to two-wheeled vehicles, such as bicycles and scooters and, more particularly, to a stabilization apparatus attached to the frame of a two-wheeled vehicle that stabilizes such vehicle during use.

BACKGROUND OF THE INVENTION

A bicycle is as pedal-driven vehicle with two wheels attached to a frame, one behind and in-line with respect to the other. A person who rides a bicycle is a cyclist or bicyclist. Bicycles were introduced in the early 19$^{th}$ century, and are useful not only as simple transportation but also for recreation and fitness purposes. Scooters also have two wheels. However, unlike bicycles, scooters are motor-driven.

Because vehicles such as bicycles and scooters have two wheels, a bit of training and practice is required in order to ride such two-wheeled vehicles safely and efficiently. However, for uncoordinated people and people that suffer from balance problems or disorders riding bicycles and scooters is particularly dangerous and generally not recommended regardless of how much practice or training they have. In order to allow uncoordinated people and people with balance disorders to use two-wheeled vehicles, what is therefore needed is an improved stabilization apparatus useful in conjunction with a two-wheeled vehicle, such as bicycle and even a scooter, to provide such two-wheeled vehicle with improved stabilization during use to allow such two-wheeled vehicle to be safely, easily, and efficiently used by uncoordinated people and people challenged with balance disorders.

SUMMARY OF THE INVENTION

According to the principle of the invention, a vehicle assembly includes a two-wheeled vehicle having a front wheel positioned in front of an opposed rear wheel that is in-line with respect to the front wheel, and a stabilization apparatus including a front stabilizer assembly attached to the vehicle proximate to the front wheel, and a rear stabilizer assembly attached to the vehicle proximate to the rear wheel. The front stabilizer assembly includes a first pair of opposed wheels resiliently mounted to a first framework secured to the vehicle to resiliently interact with the ground on either side of the vehicle proximate to the front wheel over which the vehicle is ridden to stabilize the vehicle, and the rear stabilizer assembly includes a second pair of opposed wheels resiliently mounted to a second framework secured to the vehicle to resiliently interact with the ground on either side of the vehicle proximate to the rear wheel over which the vehicle is ridden to stabilize the vehicle. The two-wheeled vehicle is a bicycle in a preferred embodiment.

According to the principle of the invention, a vehicle assembly includes a two-wheeled vehicle including a frame having opposed first and second sides, opposed front and rear ends, and a front wheel mounted for rotation to the frame proximate to the front end of the frame positioned in front of an opposed rear wheel mounted for rotation to the frame proximate to the rear end of the frame and that is substantially in-line with respect to the front wheel. A first forward stabilizer wheel and a first rearward stabilizer wheel are each mounted to a first support assembly secured to the frame between the front and rear wheels. The first support assembly supports the first forward stabilizer wheel along the first side of the frame proximate to, and outboard of, the front wheel of the vehicle, and supports the first rearward stabilizer wheel along the first side of the frame proximate to, and outboard of, the rear wheel of the vehicle. A second forward stabilizer wheel and a second rearward stabilizer wheel are each mounted to a second support assembly secured to the frame between the front and rear wheels. The second support assembly supports the second forward stabilizer wheel along the second side of the frame proximate to, and outboard of, the front wheel of the vehicle so as to oppose the first forward stabilizer wheel, and supports the second rearward stabilizer wheel along the second side of the frame proximate to, and outboard of, the rear wheel of the vehicle so as to oppose the first rearward stabilizer wheel. The first and second forward stabilizer wheels are positioned to interact with the ground over which the vehicle is driven along the first and second sides of the frame proximate to the front wheel of the vehicle to stabilize the vehicle proximate to the front end of the frame of the vehicle. The first and second rearward stabilizer wheels are positioned to interact with the ground over which the vehicle is driven along the first and second sides of the frame proximate to the rear wheel of the vehicle to stabilize the vehicle proximate to the rear end of the frame of the vehicle. The front wheel rotates about a first axis of rotation, the rear wheel rotates about a second axis of rotation, the first and second forward stabilizer wheels are positioned proximate to the first axis of rotation of the front wheel, and the first and second rearward stabilizer wheels are positioned proximate to the second axis of rotation of the rear wheel. The first forward stabilizer wheel is substantially in-line with respect to the first rearward stabilizer wheel. The second forward stabilizer wheel is substantially in-line with respect to the second rearward stabilizer wheel. In a particular embodiment, the vehicle assembly is fashioned with an axle, having a first end portion positioned proximate to the first side of the frame of the vehicle and an opposed second end portion positioned proximate to the second side of the frame of the vehicle, which is mounted to a connector assembly affixed to the frame of the vehicle between the front and rear wheels. The first support assembly is mounted to the first end portion of the axle, and the second support assembly mounted to the second end portion of the axle. The first support assembly is further mounted to the first end portion of the axle for pivotal movement, and the second support assembly is further mounted to the second end portion of the axle for pivotal movement. The axle is mounted to the connector assembly for movement between a raised position toward the frame of the vehicle away from the ground over which the vehicle is driven, and a lowered position away from the frame of the vehicle toward the ground over which the vehicle is driven. The first forward and rearward stabilizer wheels are each mounted to the first support assembly for swiveling movement, and the second forward and rearward stabilizer wheels are each mounted to the second support assembly for swiveling movement.

According to the principle of the invention, a vehicle assembly includes a two-wheeled vehicle including a frame having opposed first and second sides, opposed front and rear ends, and a front wheel mounted for rotation to the frame proximate to the front end of the frame positioned in front of an opposed rear wheel mounted for rotation to the frame proximate to the rear end of the frame and that is substantially in-line with respect to the front wheel. A member is carried by the frame of the vehicle between the front and rear wheels and has first and second end portions disposed adjacent to the respective first and second sides of the frame. A wheeled stabilizer assembly is carried by each of the first and second end portions of the member to wheelingly interact with the ground over which the vehicle is driven along the first and second sides of the frame proximate to the front and rear wheels of the vehicle to stabilize the vehicle as the vehicle is driven over the ground. The member is mounted to the frame of the vehicle for movement between a raised position of the first and second end portions toward the frame of the vehicle away from the ground over which the vehicle is driven, and a lowered position of the first and second end portions away from the frame of the vehicle toward the ground over which the vehicle is driven. The wheeled stabilizer assemblies each include a framework having an attached forward stabilizer wheel disposed proximate the front wheel of the vehicle and an attached rearward stabilizer wheel disposed proximate to the rear wheel of the vehicle. The forward stabilizer wheel is substantially in-line with respect to rearward stabilizer wheel in each of the wheeled stabilizer assemblies. The wheeled stabilizer assemblies are each mounted for pivotal movement to the respective first and second end portions of the member.

According to the principle of the invention, a vehicle assembly includes a two-wheeled vehicle including a frame having opposed first and second sides, opposed front and rear ends, and a front wheel mounted for rotation to the frame proximate to the front end of the frame positioned in front of an opposed rear wheel mounted for rotation to the frame proximate to the rear end of the frame and that is substantially in-line with respect to the front wheel. A member is carried by the frame of the vehicle between the front and rear wheels and has first and second end portions disposed adjacent to the respective first and second sides of the frame. First and second wheeled stabilizer assemblies are carried by the first and second end portions, respectively, of the member to wheelingly interact with the ground over which the vehicle is driven along the first and second sides of the frame proximate to the front and rear wheels of the vehicle to stabilize the vehicle as the vehicle is driven over the ground. The first wheeled stabilizer assembly includes a first elongate support member disposed proximate to and extending along the first side of the frame of the vehicle, the first elongate support member including a first leading end directed toward the front wheel of the vehicle and a first trailing end directed toward the rear wheel of the vehicle, a first front arm attached to the first leading end of the first elongate support member and extending outwardly therefrom with respect to the first elongate support member and the first side of the frame of the vehicle to a first forward wheeled end disposed proximate to and outboard of the front wheel of the vehicle, and a first rear arm attached to the first trailing end of the first elongate support member and extending outwardly therefrom with respect to the first elongate support member and the first side of the frame of the vehicle to a first rearward wheeled end disposed proximate to and outboard of the rear wheel of the vehicle. The second wheeled stabilizer assembly includes a second elongate support member disposed proximate to and extending along the second side of the frame of the vehicle, the second elongate support member including a second leading end directed toward the front wheel of the vehicle and a second trailing end directed toward the rear wheel of the vehicle, a second front arm attached to the second leading end of the second elongate support member and extending outwardly therefrom with respect to the second elongate support member and the second side of the frame of the vehicle to a second forward wheeled end disposed proximate to and outboard of the front wheel of the vehicle, and a second rear arm attached to the second trailing end of the second elongate support member and extending outwardly therefrom with respect to the second elongate support member and the second side of the frame of the vehicle to a second rearward wheeled end disposed proximate to and outboard of the rear wheel of the vehicle. The first elongate support member is substantially parallel with respect to the second elongate support member. The member is mounted to the frame of the vehicle for movement between a raised position of the first and second end portions toward the frame of the vehicle away from the ground over which the vehicle is driven, and a lowered position of the first and second end portions away from the frame of the vehicle toward the ground over which the vehicle is driven. The first forward wheeled end of the first wheeled stabilizer assembly is substantially in-line with respect to the first rearward wheeled end of the first wheeled stabilizer assembly, and the second forward wheeled end of the second wheeled stabilizer assembly is substantially in-line with respect to the second rearward wheeled end of the second wheeled stabilizer assembly.

BRIEF DESCRIPTION OF THE DRAWINGS

Referring to the drawings:

FIG. 2 is a fragmented perspective view of the bicycle of FIG. 1 illustrating the front stabilizer assembly of the stabilization apparatus;

FIG. 3 is a fragmented, side elevation view of the front stabilizer assembly of FIG. 2;

FIG. 4 is a fragmented, front elevation view of the front stabilizer assembly of FIG. 2;

FIG. 5 is a fragmented, rear elevation view of the front stabilizer assembly of FIG. 2;

FIG. 6 is a fragmented, bottom plan view of the front stabilizer assembly of FIG. 2;

FIG. 7 is a fragmented perspective view of the bicycle of FIG. 1 illustrating the rear stabilizer assembly of the stabilization apparatus;

FIG. 8 is a fragmented, side elevation view of the rear stabilizer assembly of FIG. 7;

FIG. 9 is a fragmented, front elevation view of the rear stabilizer assembly of FIG. 7;

FIG. 10 is a fragmented, rear elevation view of the rear stabilizer assembly of FIG. 7;

FIG. 11 is a fragmented, bottom plan view of the rear stabilizer assembly of FIG. 7;

FIG. 12 is a fragmented, side elevation view of an alternate embodiment of a stabilizer assembly constructed and arranged in accordance with the principle of the invention;

FIG. 13 is a fragmented, front elevation view of yet another alternate embodiment of a stabilizer assembly constructed and arranged in accordance with the principle of the invention;

FIG. 21 is a front plan view of a connector assembly of the stabilization apparatus of the vehicle assembly of FIG. 15 shown as it would appear adjusted into a first position;

FIG. 22 is a fragmented, front elevation view of the vehicle assembly of FIG. 15 illustrating the connector assembly of the stabilization apparatus shown adjusted into the first position illustrated in FIG. 21;

FIG. 23 is a front plan view of the connector assembly similar to that of FIG. 21 illustrating the connector assembly as it would appear adjusted into a second position different from the first position illustrated in FIGS. 21 and 22; and FIG. 24 is a fragmented, front elevation view of the vehicle assembly of FIG. 22 illustrating the connector assembly of the stabilization apparatus shown adjusted into the second position illustrated in FIG. 23.

DETAILED DESCRIPTION

Figure 1:
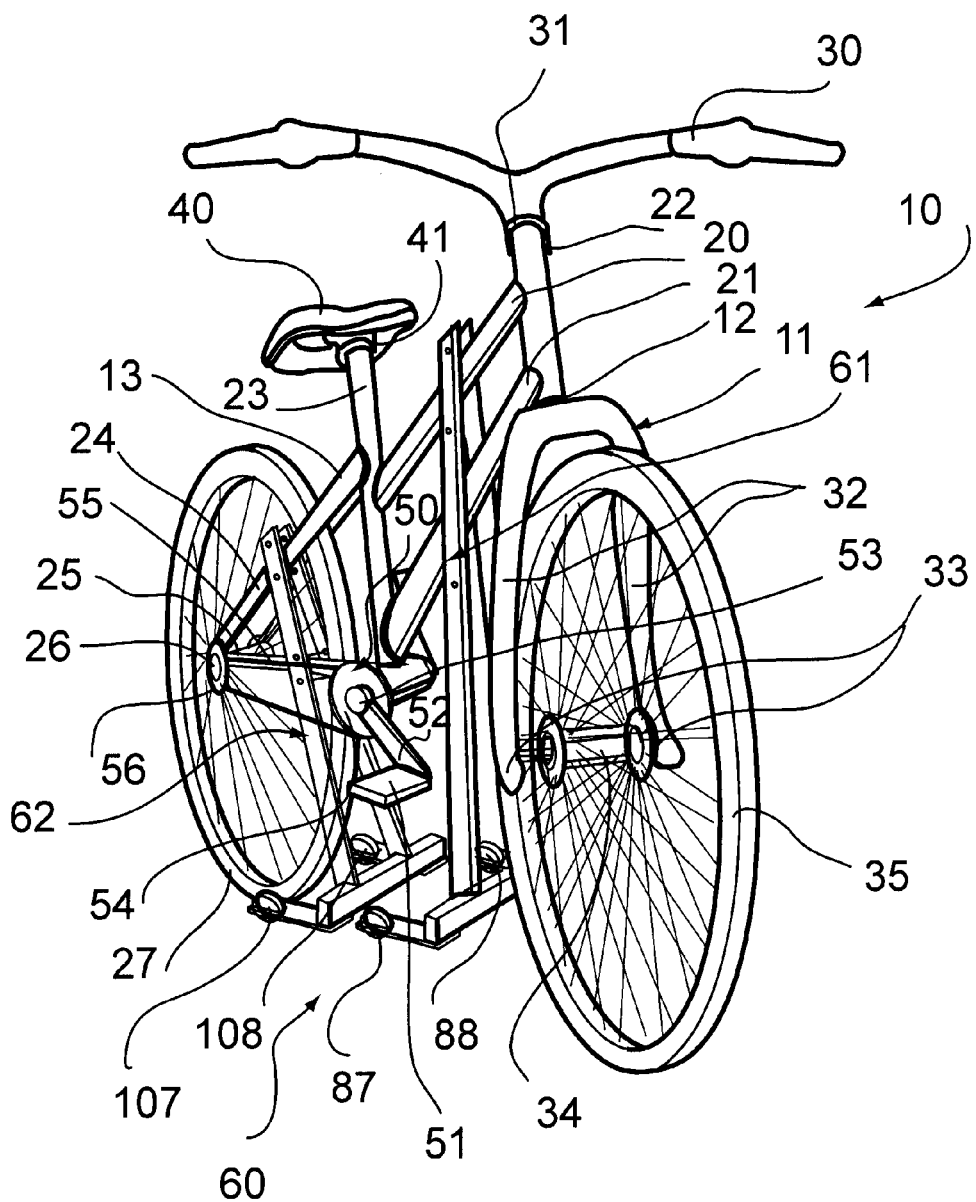
FIG. 1 is a perspective view of a vehicle assembly consisting of a bicycle fitted with a stabilization apparatus constructed and arranged in accordance with the principle of the invention to provide the bicycle with improved stability during use, the stabilization apparatus including a front stabilizer assembly formed at a front end of the bicycle and a rear stabilizer assembly formed at a rear end of the bicycle.

Turning now to the drawings, in which like reference characters indicate corresponding elements throughout the several views, attention is first directed to FIG. 1 in which there is seen a bicycle 10 including a frame 11 having a front or forward end denoted generally at 12, and an opposed rear or rearward end denoted generally at 13. Front end 12 of frame 11 may be considered the front end of bicycle 10, and rear end 13 of frame 11 may be considered the rear end of bicycle 10. Frame 11 consists of a top tube 20 and an opposed down tube 21 that extend between front 12 and rear 13. Top and bottom tubes 20 and 21 are connected at front 12 with a head tube 22, and are connected at rear 13 with an upright seat tube 23. Opposed seat stays 24 (only one shown) are connected to top tube 20 and seat tube 23 proximate to rear 13 of frame 11, and opposed chain stays 25 (only one shown) are connected to bottom tube 21 and seat tube 23 at rear 13 of frame 11. Seat stays 24 extend downwardly and rearwardly from top tube 20 and seat tube 23, chain stays 25 extend rearwardly of bottom tube 21 and seat tube 23, and seat stays 24 and chain stays 25 meet and connect at rear 13 of frame 11 and are coupled to a rear hub 26 of a rear wheel 27.

At front 12 of frame 11, handlebars 30 are connected to head tube 22 with a headset 31 that is connected to the upper end of a fork stem (not shown) that extends downwardly through head tube 22 to front forks 32, which extend downwardly and terminate with free ends 33 connected to a front hub 34 of a front wheel 35. Front wheel 35 is positioned in front of rear wheel 27, and rear wheel 27 is in-line with respect to front wheel 35. A seat 40 is mounted to a seat post 41 that extends into and is rigidly connected to seat tube 23. Bicycle 10 is pedal-driven, and includes a pedal-driven drive train 50 consisting of pedals 51 (only one shown) attached to crank arms 52 (only one shown) rigidly connected to a bottom bracket 53 that is, in turn, rigidly connected to a chainring 54. An endless chain 55 concurrently encircles and operatively couples chainring 54 to cassette 56 formed in rear hub 26 to impart rotation to rear wheel 27 in response to rotation of chainring 54 made through a pedaling action applied to pedals 51, such as by a user seated on seat 40. Drive train 50 is a conventional form of a pedaled drive train commonly found among conventional bicycles.

Bicycle 10 is exemplary of a non-motorized two-wheeled vehicle, is entirely conventional and is generally representative of any one of a variety of commercially available bicycles. Accordingly, further details of bicycle not herein specifically disclosed will readily occur to those having ordinary skill and are not discussed in further detail.

In accordance with the principle of the invention, bicycle 10 is formed with a stabilization apparatus denoted generally at 60. The combination of bicycle 10 and stabilization apparatus 60 forms a vehicle or bicycle assembly according to the principle of the invention. Apparatus 60 consists of a main or front stabilizer assembly denoted at 61, and an opposed trailing or rear stabilizer assembly denoted at 62. Assemblies 61 and 62 are wheeled assemblies which are attached to bicycle 10 and, more particularly, to frame 11 of bicycle 10. Assemblies 61 and 62 interact with the ground and cooperate together to stabilize bicycle 10 during use to assist a user using bicycle 10 in the normal manner in balancing bicycle, and this is particularly useful for users that suffer from balance disorders or who are uncoordinated. Front assembly 61 is attached to bicycle 10 proximate to front 12 of bicycle 10 forwardly of bottom bracket 53, and rear assembly 62 is attached to bicycle 10 proximate to rear 13 of bicycle 10 rearwardly of bottom bracket 53.

Referencing FIG. 2, assembly 61 consists of framework formed by opposed front stays 70 and 71 rigidly affixed to frame 11. In the present embodiment, the framework formed by front stays 70 and 71 is secured to top and bottom tubes 20 and 21 of frame 11. Stays 70 and 71 are fashioned of strong, rigid material, such as steel, aluminum, carbon fiber, or the like, are located on either side of top and bottom tubes 20 and 21 of frame 11, and are clamped together to clamp onto and embrace top and bottom tubes 20 and 21 with fasteners 74, which may be rivets, nut-and-bolt assemblies, or the like. Stays 70 and 71 extend downwardly with respect to top and bottom tubes 20 and 21 of frame 11, and terminate with free ends 70A and 71A rigidly affixed, with welding or with fasteners such as rivets or screws or nut-and-bolt assemblies or the like, to a support 80, which, as seen in FIG. 1, is located just rearwardly of front wheel 35 of bicycle 10 and forwardly of bottom bracket 53.

Support 80 is elongate, substantially horizontal, has opposed ends 81 and 82, and, like stays 70 and 71, is preferably fashioned of strong, rigid material, such as steel, aluminum, carbon fiber, or the like. Elongate flexible arms 84 and 85 are attached at either end of support 80. Arm 84 has a proximal end 84A affixed, with welding or with fasteners such as rivets or screws or nut-and-bolt assemblies or the like, to support 80 proximate to end 81 of support 80, and extends rearwardly of support 80, and front wheel 35 of bicycle 10 as shown in FIG. 1, to a distal end 84B journaled to a wheel 87. Arm 85 has a proximal end 85A affixed, with welding or with fasteners such as rivets or screws or nut-and-bolt assemblies or the like, to support 80 proximate to end 82 of support 80, and extends rearwardly of support 80, and front wheel 35 of bicycle 10 as shown in FIG. 1, to a distal end 85B journaled to a wheel 88. Wheels 87 and 88 are located at either end of support 80, and this is best illustrated in FIG. 4, which is a fragmented, front elevation view of assembly 61, FIG. 5, which is a fragmented, rear elevation view of assembly 61, and FIG. 6, which is a fragmented, bottom plan view of assembly 61. Wheels 87 and 88 are also located on either side of frame 11 of bicycle 10 as shown in FIG. 1.

Wheels 87 and 88 are conventional caster wheels or other like or similar wheel form, and conventional hubs 87A and 88A are used to journal wheels 87 and 88 to distal ends 84B and 85B of arms 84 and 85, respectively, as best illustrated in FIG. 6. Arms 84 and 85 are preferably formed of flat strips of spring steel, or other flexible and resilient material or combination of materials. The flexible, resilient character of arms 84 and 85 biases wheels 87 and 88 into engagement against the ground over which bicycle 10 is ridden and permits wheels 87 and 88 to interact with the ground over which bicycle 10 is ridden and reciprocally displace with respect to the ground and bicycle 10 as bicycle 10 is used in the normal manner. As a matter of illustration and reference, FIG. 3 is a side elevation view of assembly 61 illustrating arm 84 attached between wheel 87 and support 80, whereby the double, arcuate arrowed line A is indicative of the reciprocal movement of wheel 87 provided by arm 84.

Referencing FIG. 7, assembly 62 consists of framework formed by opposed rear stays 90 and 91 rigidly affixed to frame 11. In the present embodiment, the framework formed by rear stays 90 and 91 is attached to seat stays 24 and chain stains 25 of frame 11. Stays 90 and 91 are fashioned of strong, rigid material, such as steel, aluminum, carbon fiber, or the like, are located on either side of the respective seat stays 24 and chain stays 25 of frame 11, and are clamped together to clamp onto and embrace seat stays 24 and chain stays 25 with fasteners 94, which may be rivets, nut-and-bolt assemblies, or the like. Stays 90 and 91 extend downwardly with respect to seat stays 24 and chain stays 25 of frame 11, and terminate with free ends 90A and 91A rigidly affixed, with welding or with fasteners such as rivets or screws or nut-and-bolt assemblies or the like, to a support 100, which, as shown in FIG. 1, is located just forwardly of rear wheel 27 under and opposing bottom bracket 53.

Support 100 is elongate, substantially horizontal, has opposed ends 101 and 102, and, like stays 90 and 91, is preferably fashioned of strong, rigid material, such as steel, aluminum, carbon fiber, or the like. Elongate flexible arms 104 and 105 are attached at either end of support 100. Arm 104 has a proximal end 104A affixed, with welding or with fasteners such as rivets or screws or nut-and-bolt assemblies or the like, to support 100 proximate to end 101 of support 100, and extends rearwardly of support 100, and toward rear wheel 27 as shown in FIG. 1, to a distal end 104B journaled to a wheel 107. Arm 105 has a proximal end 105A affixed, with welding or with fasteners such as rivets or screws or nut-and-bolt assemblies or the like, to support 100 proximate to end 102 of support 100, and extends rearwardly of support 100, and toward rear wheel 27 as shown in FIG. 1, to a distal end 105B journaled to a wheel 108. Wheels 107 and 108 are located at either end of support 100, and this is best illustrated in FIG. 9, which is a fragmented, front elevation view of assembly 62, FIG. 10, which is a fragmented, rear elevation view of assembly 62, and FIG. 11, which is a fragmented, bottom plan view of assembly 62. Wheels 107 and 108 are also located on either side of frame 11 of bicycle 10 as shown in FIG. 1.

Wheels 107 and 108 are conventional caster wheels or other like or similar wheel form, and conventional hubs 107A and 108A are used to journal wheels 107 and 108 to distal ends 104B and 105B of arms 104 and 105, respectively, as best illustrated in FIG. 11. Arms 104 and 105 are preferably formed of flat strips of spring steel, or other flexible and resilient material or combination of materials. The flexible, resilient character of arms 104 and 105 biases wheels 107 and 108 into engagement with the ground over which bicycle 10 is ridden and permits wheels 107 and 108 to interact with the ground over which bicycle 10 is ridden and to reciprocally displace with respect to the ground and bicycle 10 as bicycle 10 is used in the normal manner. As a matter of illustration and reference, FIG. 8 is a side elevation view of assembly 62 illustrating arm 104 attached between wheel 107 and support 100, whereby the double, arcuate arrowed line B is indicative of the reciprocal movement of wheel 107 provided by arm 104.

Wheels 87 and 88 of assembly 61 define two wheeled contact points of stabilization apparatus 60 proximate to front end 12 of bicycle 10 on either side of frame 11 and front wheel 35 of bicycle 10, and wheels 107 and 108 of assembly 62 define two wheeled contact points of stabilization apparatus 60 proximate to rear end 13 of bicycle 10 on either side of frame 11 and rear wheel 27 of bicycle 10. As such, wheels 87, 88, 107, and 108 of stabilization apparatus 60 form four wheeled contact points, two on either side of bicycle 10, to stabilize bicycle 10 during the normal use thereof as bicycle is ridden over the ground. Wheels 87 and 107 on one side of bicycle 10 and wheels 88 and 108 on the opposing side of bicycle 10 form a four-point wheeled footprint, whereby wheels 87, 88, 107, and 108 engage against and wheelingly interact with the ground over which bicycle 10 is ridden stabilizing bicycle 10 during the normal use thereof to assist users that are uncoordinated or may suffer from a balance disorder in safely riding bicycle 10. As previously explained, the flexible, resilient character of arms 84 and 85 biases wheels 87 and 88 into engagement against the ground over which bicycle 10 is ridden and permits wheels 87 and 88 to interact with the ground over which bicycle 10 is ridden and reciprocally displace with respect to the ground and bicycle 10 as bicycle 10 is used in the normal manner, the flexible, resilient character of arms 104 and 105 biases wheels 107 and 108 into engagement with the ground over which bicycle 10 is ridden and permits wheels 107 and 108 to interact with the ground over which bicycle 10 is ridden and to reciprocally displace with respect to the ground and bicycle 10 as bicycle 10 is used in the normal manner. Moreover, the flexible, resilient character of arms 84 and 85 not only biases wheels 87 and 88 into engagement against the ground over which bicycle 10 is ridden but also permit wheels 87 and 88 to reciprocate with respect to bicycle 10 and the ground over which bicycle 10 is ridden to allow bicycle 10 to be leaned somewhat to each side to allow bicycle 10 to be easily turned to the left and to the right with ease while ensuring wheels 87 and 88 remain in contact with the ground to provide the required stabilization, in accordance with the principle of the invention. Similarly, the flexible, resilient character of arms 104 and 105 not only biases wheels 107 and 108 into engagement against the ground over which bicycle 10 is ridden but also permit wheels 107 and 108 to reciprocate with respect to bicycle 10 and the ground over which bicycle 10 is ridden to allow bicycle 10 to be leaned somewhat to each side to allow bicycle 10 to be easily turned to the left and to the right with ease while ensuring wheels 107 and 108 remain in contact with the ground to provide the required stabilization, in accordance with the principle of the invention.

The frameworks of the front and rear stabilizer assemblies 61 and 62 can be secured to frame 11 at any suitable location and in any way suitable to rigidly secure them in place so as to operate in accordance with the teachings provided by this specification. Also, FIG. 12 is a side elevation view of an alternate embodiment of a stabilizer assembly 110 for use with a stabilization apparatus constructed and arranged in accordance with the principle of the invention. In common with stabilizer assembly 61, stabilizer assembly 110 shares the front stays (only stay 70 is depicted), support 80, and the wheels attached to support 80 with the arms (only wheel 87 and arm 84 are depicted). In assembly 110, a wheel 111, such as conventional caster wheel or other wheel form like that of wheel 87, is journaled with a conventional hub 112 to support 80. In this embodiment, wheel 111 is available to make wheeled contact with the ground over which the bicycle to which assembly 110 is attached to is ridden when the bicycle is turned too far to the left or to the right, and this provides additional stabilization. Assembly 110 in FIG. 12 has one wheel 111 journaled to support 80, and more can be journaled to support 80 as may be desired. Stabilizer assembly 62 of stabilization apparatus 60 may be similarly modified according to the assembly depicted in FIG. 12.

FIG. 13 is a front elevation view of an alternate embodiment of a stabilizer assembly 120 for use with a stabilization apparatus constructed and arranged in accordance with the principle of the invention. In common with stabilizer assembly 61, stabilizer assembly 110 shares the front stays 70 and 71 and attached support 80. In this embodiment an elongate rigid extension 121 is affixed to end 81 of arm support 80, and an elongate rigid extension 122 is affixed to end 82 of arm support 80. Extensions 121 and 122 extend outwardly with respect to ends 81 and 82, respectively, of arm support 80, and terminate with outer ends 121A and 122A, respectively. Arm 84 and wheel 87 are attached at end 121A of extension 121, and arm 85 and wheel 88 are attached at end 122A of extension 122. In this embodiment, extensions 121 and 122 provide a broader footprint of wheels 87 and 88 for even further increased stabilization as compared to the narrower footprint of wheels 87 and 88 in assembly 61. Stabilizer assembly 62 of stabilization apparatus 60 may be similarly modified according to the assembly depicted in FIG. 13.

Figure 14:
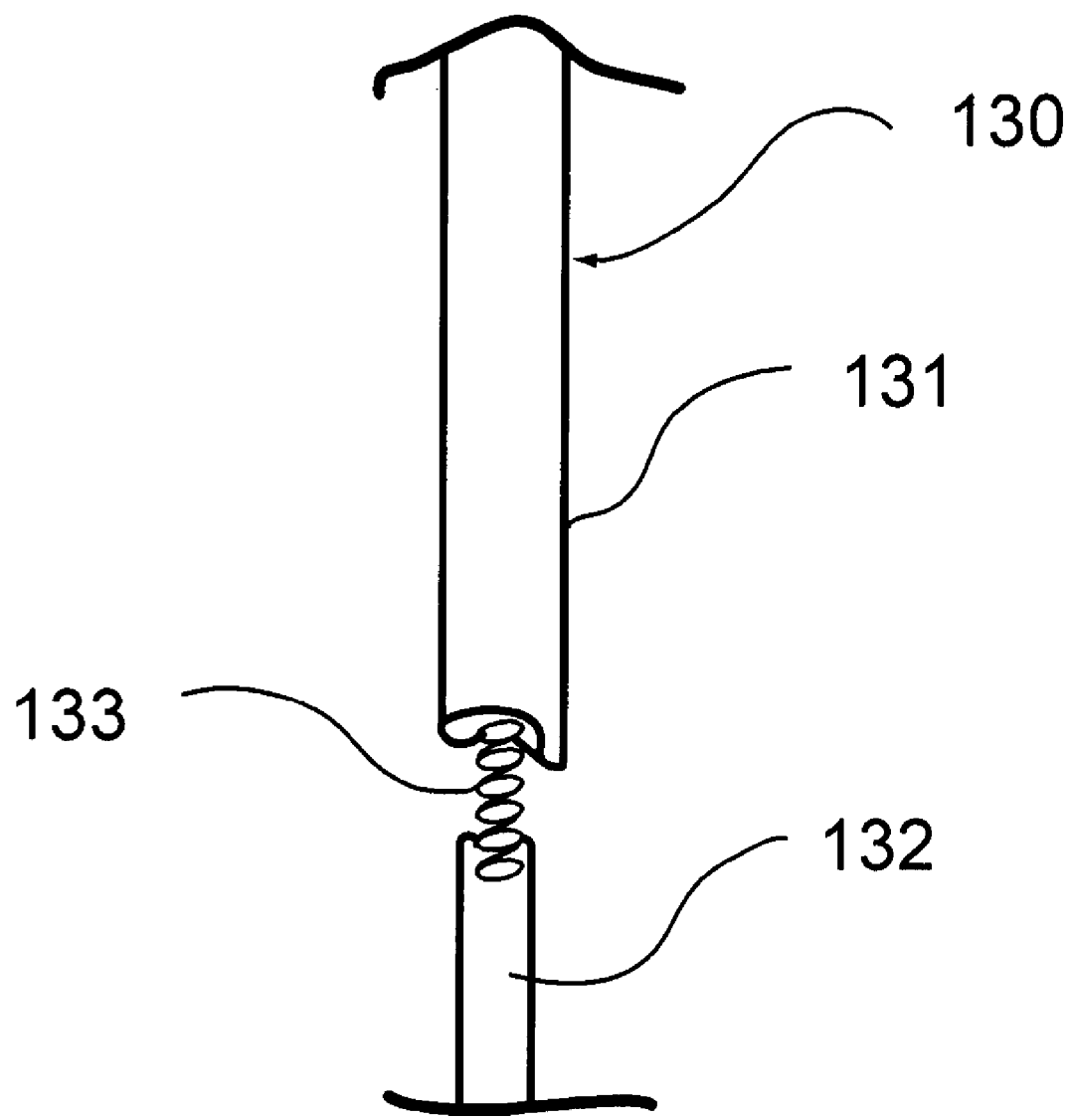
FIG. 14 is a fragmented, side elevation view of a stay for use with a stabilizer assembly of a stabilization apparatus constructed and arranged in accordance with the principle of the invention, in which portions of the stay are cutaway from illustrative purposes.

FIG. 14 is a fragmented, side elevation view of a stay 130 for use with a stabilizer assembly of a stabilization apparatus constructed and arranged in accordance with the principle of the invention, in which portions of stay 130 are cutaway from illustrative purposes. Stay 130 can be used in place each front stay of assembly 61, and/or each rear stay of assembly 62. In this embodiment, stay 130 is formed by a pair of reciprocally mounted elongate stay members 131 and 132 including a spring 133 formed there between that acts against stay members 131 and 132 biasing them apart. Stay members 131 and 132 reciprocate with respect to each other allowing stay 130 to assume shortened and lengthened conditions or positions as the bicycle having a stabilizer assembly incorporating stay 130 is turned to the left and to the right, and spring 133 functions to urge stay 130 into its lengthened condition or position to ensure the stabilization wheels associated with stay 130 remain in contact with the ground over which a bicycle is ridden. The embodiment in FIG. 14 is exemplary of a reciprocating stay assembly, and other reciprocating mechanisms can be used in other embodiments, such as pneumatic reciprocating stay members, hydraulic reciprocating stay members, etc.

Stabilization apparatus 60 is disclosed in connection with bicycle 10, which is exemplary of a non-motorized two-wheeled vehicle incorporating a front wheel positioned in front of an opposed rear wheel that is in-line with respect to the front wheel. It is to be understood that a stabilization apparatus constructed and arranged in accordance with the principle of the invention is not only particularly useful with bicycles, but may also be utilized with equally-exemplary results with scooters and other like or similar motorized two-wheeled vehicles.

Figure 15:
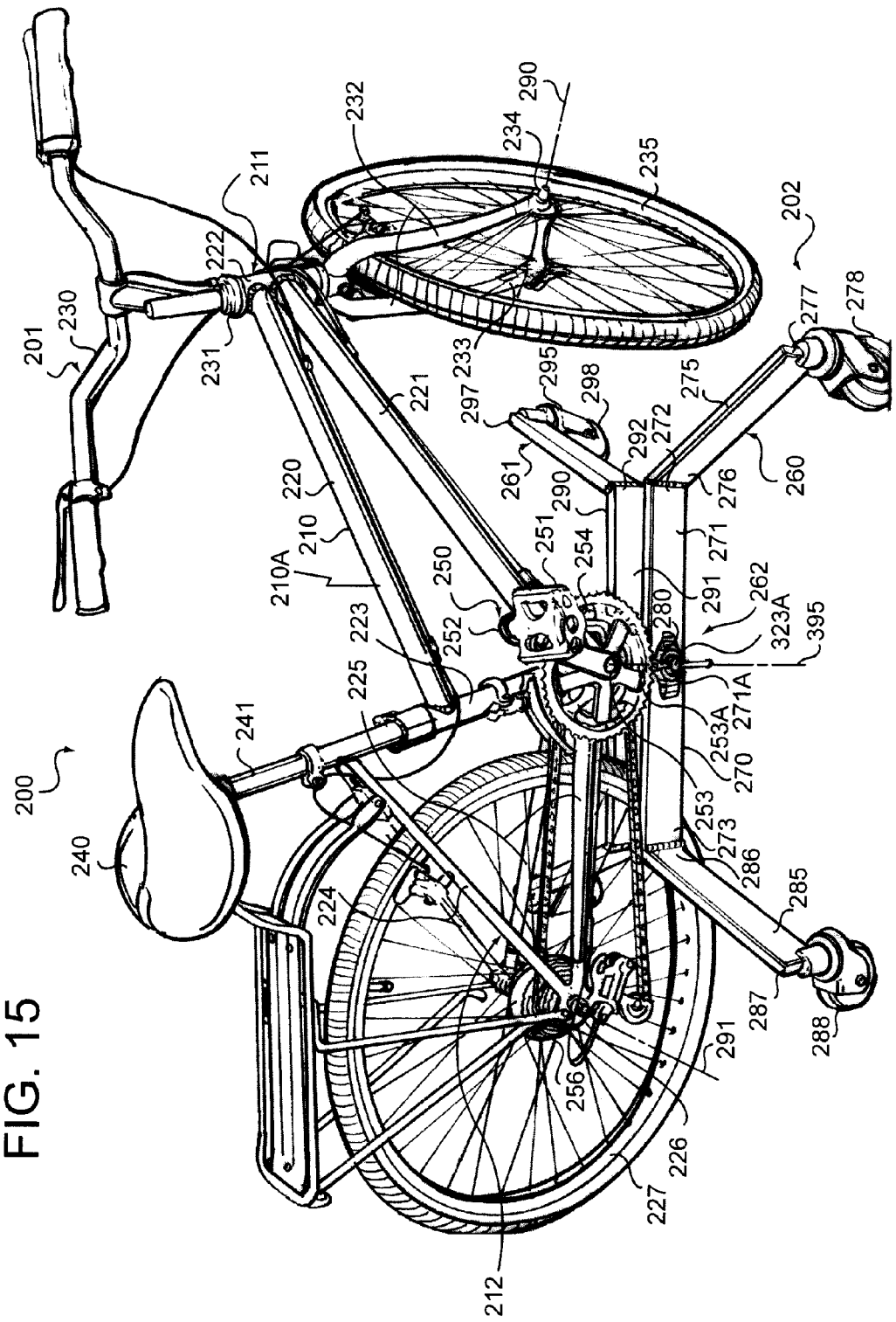
FIG. 15 is a vehicle assembly constructed and arranged in accordance with an alternate embodiment of the invention, the vehicle assembly including a vehicle in the form of a bicycle fitted with a stabilization apparatus constructed and arranged in accordance with the principle of the invention.

Reference is now made to FIG. 15 illustrating a vehicle assembly 200 constructed and arranged in accordance with an alternate embodiment of the invention, which includes a vehicle in the form of a bicycle 201 fitted with a stabilization apparatus 202 constructed and arranged in accordance with the principle of the invention. Bicycle 201 includes a frame 210 having a front or forward end denoted generally at 211, an opposed rear or rearward end denoted generally at 212, and opposed sides including side 210A denoted in FIG. 1 and opposed side 210B denoted in FIG. 2. Side 210A is considered the right side of bicycle 201 and opposed side 210B is considered the left side of bicycle 201. Front end 212 of frame 210 is considered the front end of bicycle 201, and rear end 212 of frame 210 is considered the rear end of bicycle 201. Frame 210 consists of a top tube 220 and an opposed bottom or down tube 221 that extend between front 211 and rear 212. Top and bottom tubes 220 and 221 are connected at front 211 with a head tub 222, and are connected at rear 212 with an upright seat tube 223. Opposed seat stays 224 are connected to seat tube 223 proximate to rear 212 of frame 210, and opposed chain stays 225 are connected to down tube 221 and seat tube 223 proximate to rear 212 of frame 210. Seat stays 224 extend downwardly and rearwardly from seat tube 223, chain stays 225 extend rearwardly of bottom tub 221 and seat tube 223, and seat stays 224 and chain stays 225 meet and connect at rear 212 of frame 210 and are coupled to a rear hub 226 of a rear wheel 227.

At front 222 of frame 210, handlebars 230 are connected to head tub 222 with a headset 231 that is connected to the upper end of a fork stem (not shown) that extends downwardly through head tube 222 to front forks 232, which extend downwardly and terminate with free ends 233 connected to a front hub 234 of a front wheel 235. Front wheel 235 is positioned in front of rear wheel 227, and rear wheel 227 is substantially in-line with respect to front wheel 235 as is typical and well-known with a conventional bicycle. A seat 240 is mounted to a seat post 241 that extends into and is rigidly connected to seat tub 223.

Figure 16:
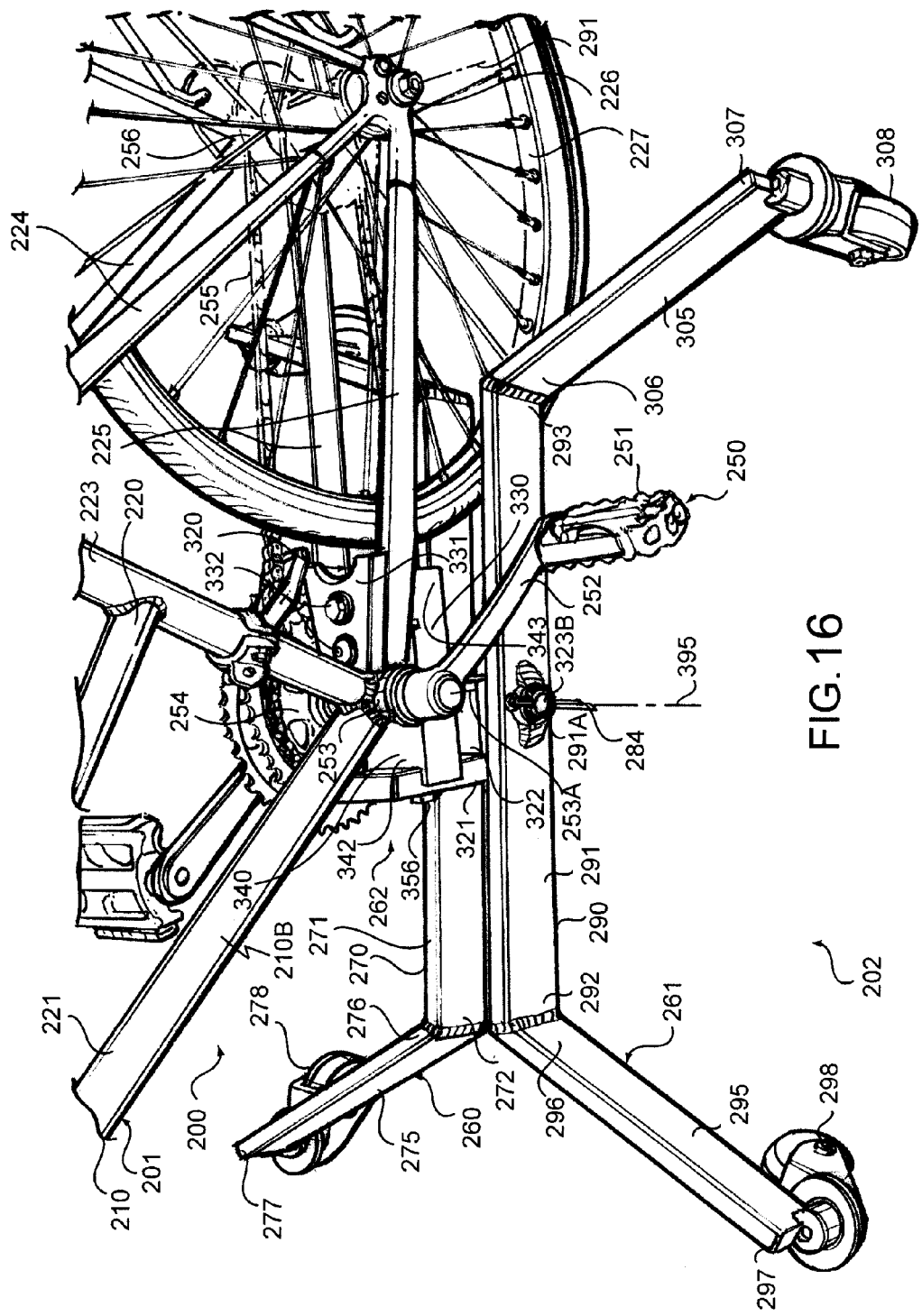
FIG. 16 is an enlarged, fragmented perspective view of the vehicle assembly of FIG. 15 showing an enlarged view of the stabilization apparatus.

Referencing FIGS. 15 and 16 in relevant part, bicycle 201 is pedal-driven, and includes a pedal-driven drive train 250 consisting of pedals 251 attached to crank arms 252 rigidly connected to a bottom bracket 253 shown in FIG. 16 that is, in turn, rigidly connected to a chainring 254. Bottom bracket 253 forms part of frame 210, and is located between front and rear wheels 235 and 227 attached to frame 210. An endless chain 255 concurrently encircles and operatively couples chainring 254 to cassette 256 formed in rear hub 226 to impart rotation to rear wheel 227 in response to rotation of chainring 254 made through a pedaling action applied to pedals 251, such as by a user seated on seat 240 referenced in FIG. 15. Pedals 251 and crank arms 252 rotate about axis 253A of bottom bracket 253. Drive train 250 is a conventional form of a pedaled drive train commonly found among conventional bicycles, further details of which will readily occur to those having ordinary skill in the art.

Bicycle 201 is a form of a vehicle. Moreover, bicycle 201 is exemplary of a non-motorized two-wheeled vehicle, is entirely conventional and is generally representative of any one of a variety of commercially available bicycles, which, in the present example, is a variety of bicycle commonly referred to as a mountain bike. Accordingly, further details of bicycle 201 not herein specifically disclosed will readily occur to those having ordinary skill and are not discussed in further detail.

In accordance with the principle of the invention, bicycle 201 is formed with stabilization apparatus denoted generally at 202. The combination of bicycle 201 and stabilization apparatus 202 forms a vehicle, a bicycle assembly, or a vehicle assembly according to the principle of the invention. Apparatus 202 includes opposed stabilizer assemblies 260 and 261, and a connector assembly 262 shown in FIG. 16. Assemblies 260 and 261 are wheeled or wheel assemblies which are attached to bicycle 201 with connector assembly 262 as shown in FIG. 16, and the connecting point of connector assembly 262 to frame 210 is at point between the opposed front and rear wheels 235 and 227 of bicycle 201. More particularly, assemblies 260 and 261 are attached to frame 210 of bicycle 201 at a location between opposed front and rear wheels 235 and 227 of bicycle 201 with connector assembly 262. Assemblies 260 and 261 interact with the ground and cooperate together to stabilize bicycle 201 during use to assist a user using bicycle 201 in the normal manner in balancing bicycle, and this is particularly useful for users that suffer from balance disorders or who are uncoordinated. Assembly 260 is located at and extends along side 210A of frame 210 of bicycle 201, and assembly 261 is located at and extends along side 210B of bicycle 201.

Figure 17:
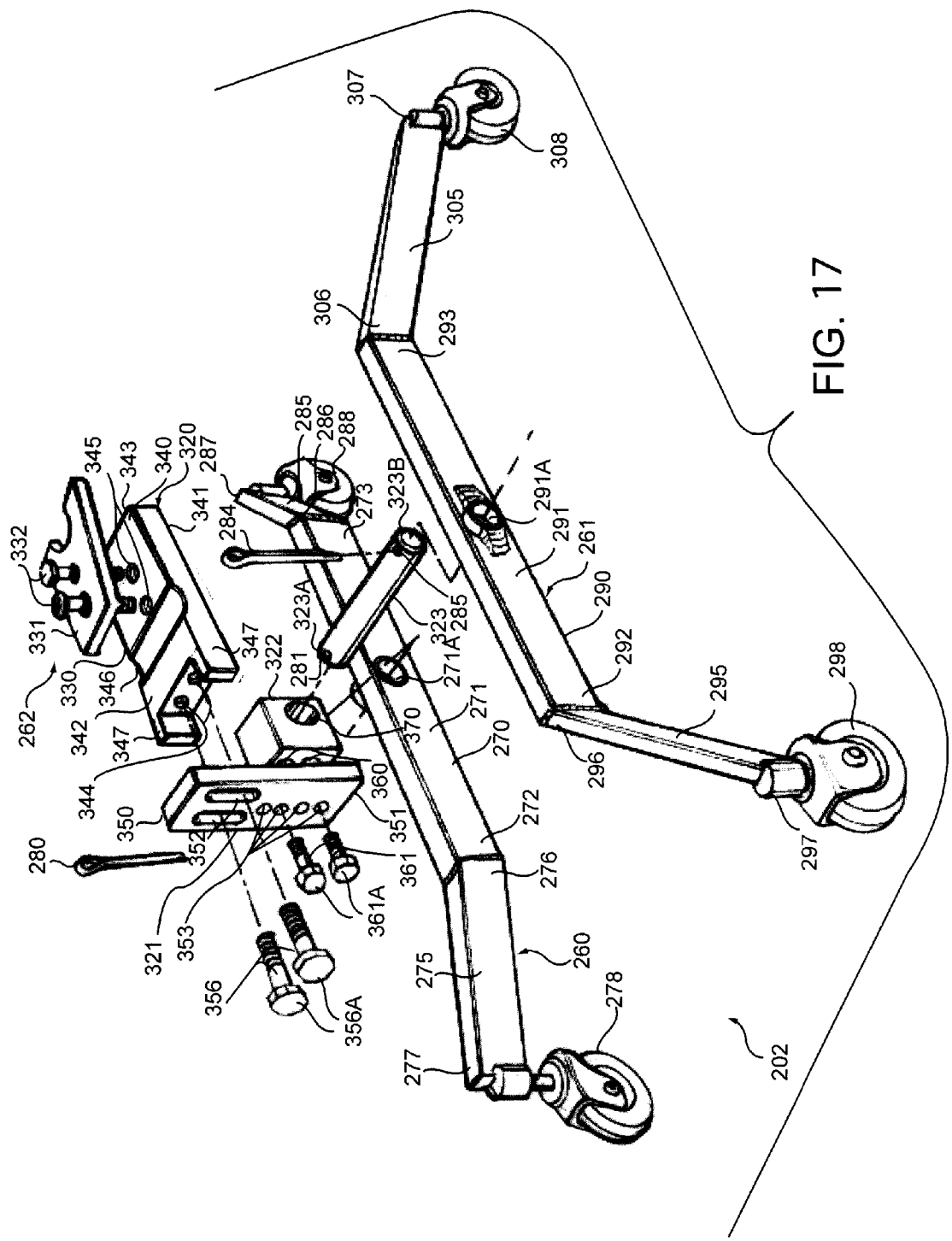
FIG. 17 is an exploded perspective view of the stabilization apparatus of FIG. 15.

Looking now to FIG. 17, which is an exploded perspective view of apparatus 202, assembly 260 consists of a support assembly 270, which is fashioned of aluminum, carbon fiber, steel, or other like or similar substantially rigid material or combination of materials, and which may be integrally formed or formed from a plurality of attached parts attached by way of welding or other form of competent joinery. Assembly 260 includes an elongate support member 271 having opposed leading and trailing ends 272 and 273. A front arm 275 has an inner or proximal extremity or end 276 attached to leading end 272 of elongate support member 271 and extends angularly outwardly therefrom with respect to elongate support member 271 to an outer or distal extremity or end 277 formed with an attached stabilizer wheel 278 that extends downwardly from outer end 277. With outer end 277 formed with stabilizer wheel 278, outer end 277 is considered a wheeled end. A rear arm 285 has an inner or proximal extremity or end 286 attached to leading end 282 of elongate support member 281 and extends angularly outwardly therefrom with respect to elongate support member 281 to an outer or distal extremity or end 287 formed with an attached stabilizer wheel 288 that extends downwardly from outer end 287. With outer end 287 formed with stabilizer wheel 288, outer end 287 is considered a wheeled end. Wheel 278 is substantially in-line with respect to wheel 288, in which case the wheeled end defined at end 277 is substantially in-line with respect to the wheeled end defined at end 287. Stabilizer wheels 278 and 288 are each conventional caster wheels, which swivel and rotate.

Assembly 261 is substantially coextensive with respect to assembly 261, is the mirror image of assembly 260 and consists of a support assembly 290 that, like support assembly 270, is fashioned of aluminum, carbon fiber, steel, or other like or similar substantially rigid material or combination of materials, and which may be integrally formed or formed from a plurality of attached parts attached by way of welding or other form of competent joinery. Assembly 290 includes an elongate support member 291 having opposed leading and trailing ends 292 and 293. A front arm 295 has an inner or proximal extremity or end 296 attached to leading end 292 of elongate support member 291 and extends angularly outwardly therefrom with respect to elongate support member 291 to an outer or distal extremity or end 297 formed with an attached stabilizer wheel 298 that extends downwardly from outer end 297. With outer end 297 formed with stabilizer wheel 298, outer end 297 is considered a wheeled end. A rear arm 305 has an inner or proximal extremity or end 306 attached to leading end 302 of elongate support member 301 and extends angularly outwardly therefrom with respect to elongate support member 301 to an outer or distal extremity or end 307 formed with an attached stabilizer wheel 308 that extends downwardly from outer end 307. With outer end 307 formed with stabilizer wheel 308, outer end 307 is considered a wheeled end. Wheel 298 is substantially in-line with respect to wheel 308, in which case the wheeled end defined at end 297 is substantially in-line with respect to the wheeled end defined at end 307. Stabilizer wheels 298 and 308 are each conventional caster wheels, which swivel and rotate.

Connector assembly 262 is formed by a bracket assembly 320, a support fixture 321, a block 322, and an elongate member or axle 323 having opposed end portions 323A and 323B, each of which is formed of aluminum, steel, or other like or similar substantially rigid material or combination of materials. Bracket assembly 320 attaches to frame 210 of bicycle 201 between front and rear wheels 235 and 227 of bicycle 201, support fixture 321 attaches to bracket assembly 320, block 322 attaches to support fixture 321, axle 323 is held by block 322, stabilizer assembly 260 attaches to, and is supported by, end portion 323A of axle 323 along side 210A of bicycle 201 as seen in FIG. 15, and stabilizer assembly 261 attaches to, and is supported by, end portion 323B of axle 323 along side 210B of bicycle 201 as seen in FIG. 16.

Bracket assembly 320 includes a base 330, a plate 331, and threaded fasteners 332, which, in this example, are threaded bolts. Base 330 has opposed upper and lower surfaces 340 and 341, opposed front and rear ends 342 and 343, threaded openings 344 formed in front end 342, threaded openings 345 formed into base 330 through upper surface 340 between front and rear ends 342 and 343, and a generally concave transverse recess 346 positioned between threaded openings 345 and front end 342 that extends between the opposed sides of base 330. Front end 342 is formed with a pair of opposed, substantially parallel extensions 347 formed on either side of threaded openings 344, which project forwardly of front end 342.

Figure 18:
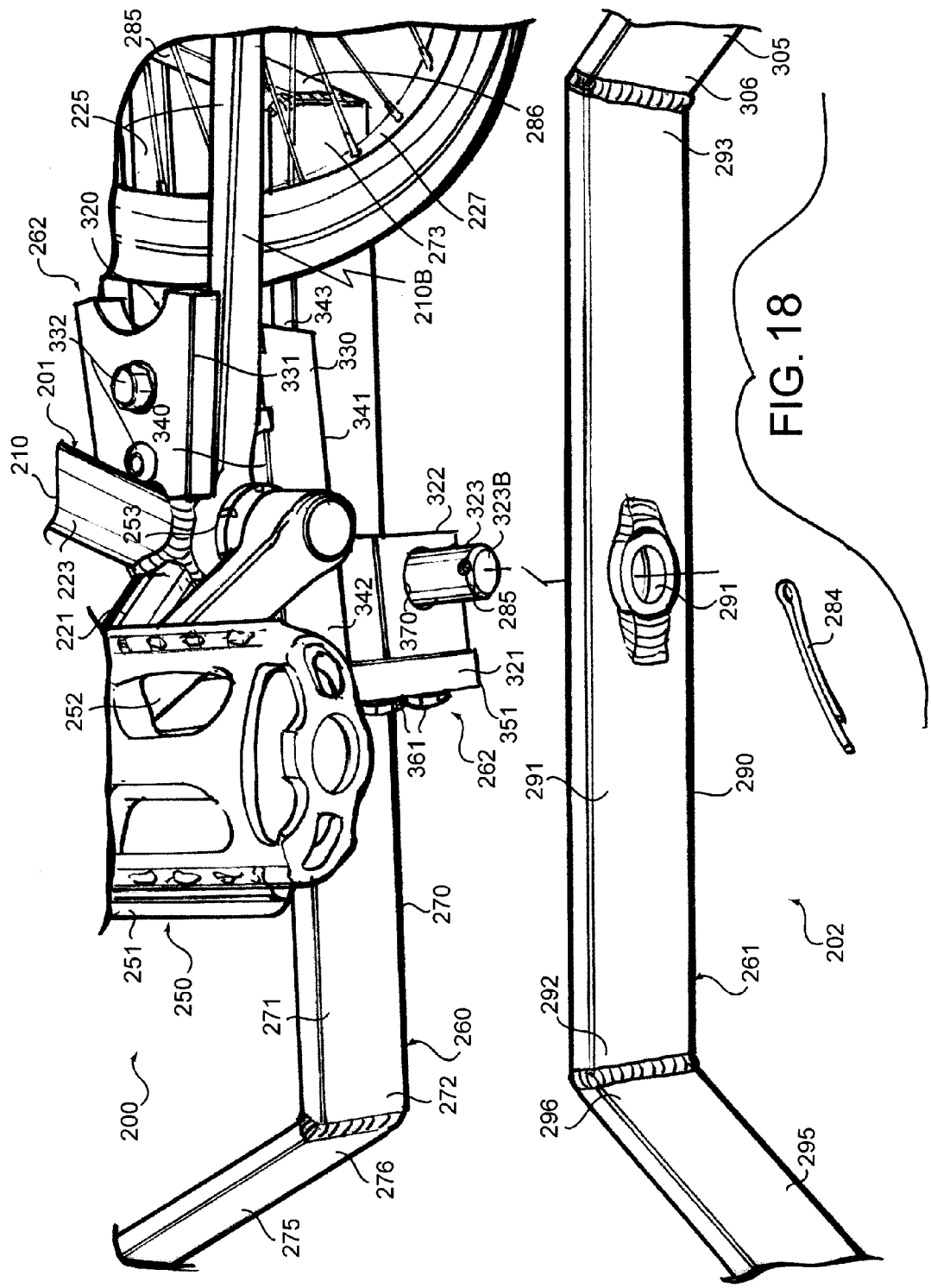
FIG. 18 is an enlarged, fragmented perspective view of the stabilization apparatus of FIG. 15 illustrating an elongate support member of the stabilization apparatus as it would appear detached from an end portion of an axle of the stabilization apparatus.
Figure 20:
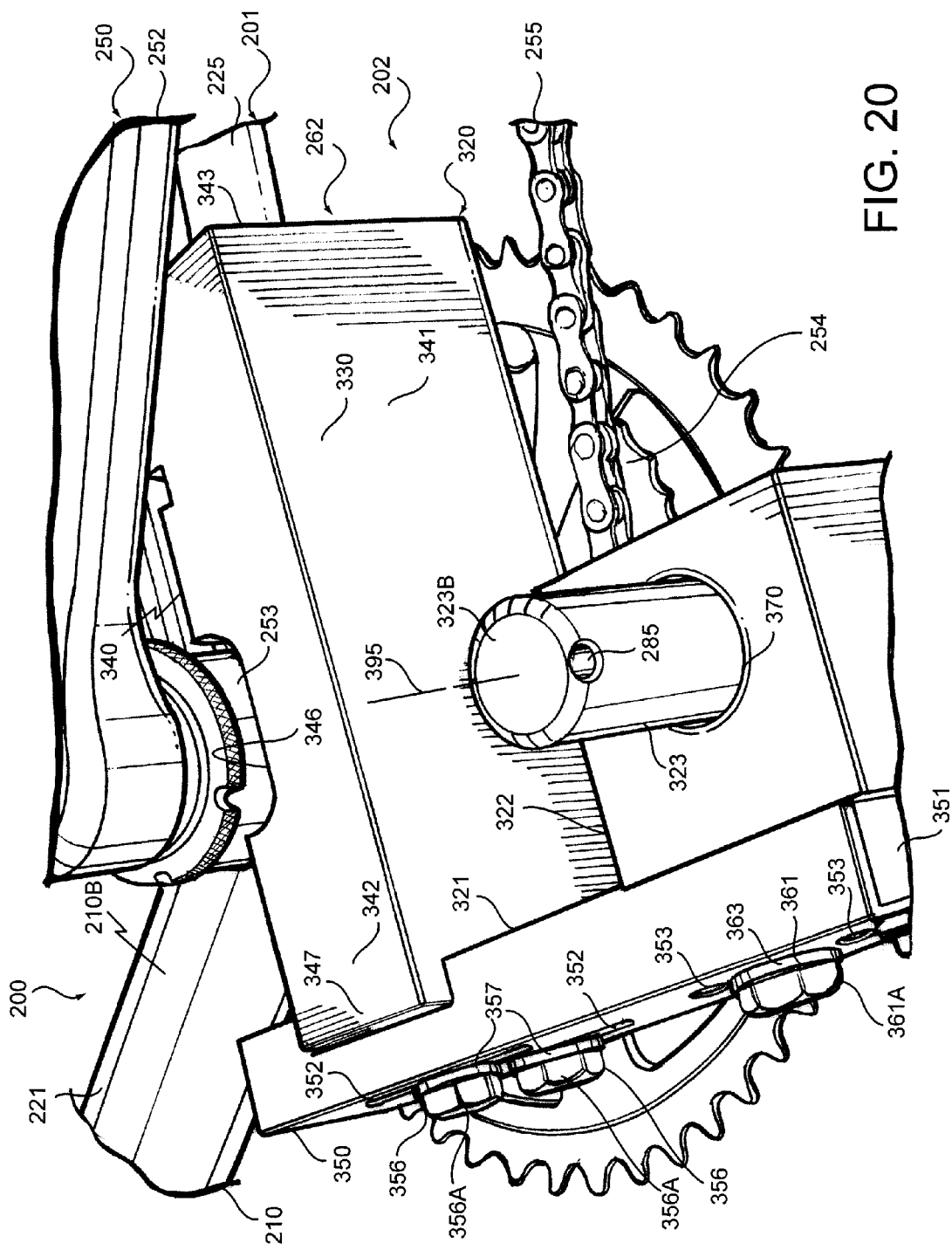
FIG. 20 is yet another enlarged, fragmented perspective view of the vehicle assembly of FIG. 15 illustrating a connector assembly of the stabilization apparatus.

Referencing FIGS. 16, 18, and 20, base 330 is applied to the underside of frame 210 of bicycle 201 at bottom bracket 253. Upper surface 340 of base 330 is applied to and against the underside of frame 210 locating bottom bracket 253 in recess 346 as seen in FIG. 20, in which front end 342 of base 330 extends forwardly with respect to bottom bracket 253 toward the front end of frame 210 of bicycle 201, and rear end 343 of base 330 extends rearwardly with respect to bottom bracket 253 toward the rear end of frame 210 of bicycle 201 along the underside of chain stays 225 referenced in FIGS. 16, 18, and 20. Plate 331 is applied against the top side of chain stays 225 opposing base 330 just rearwardly of seat tube 223 and bottom bracket 253 as seen in FIGS. 16 and 18, and is secured to base 330 with threaded fasteners 332, which extend through openings formed in plate 331 and into and through the gap between chain stays 225 and which are threadably received by threaded openings 345 (FIG. 17) formed in base 330 and which are then rotated and tightened thereby rigidly plate 331 to base 330 and rigidly securing chain stays 225 between plate 331 and base 330 and rigidly securing locating bottom bracket 253 in recess 346 formed in base 330.

Figure 19:
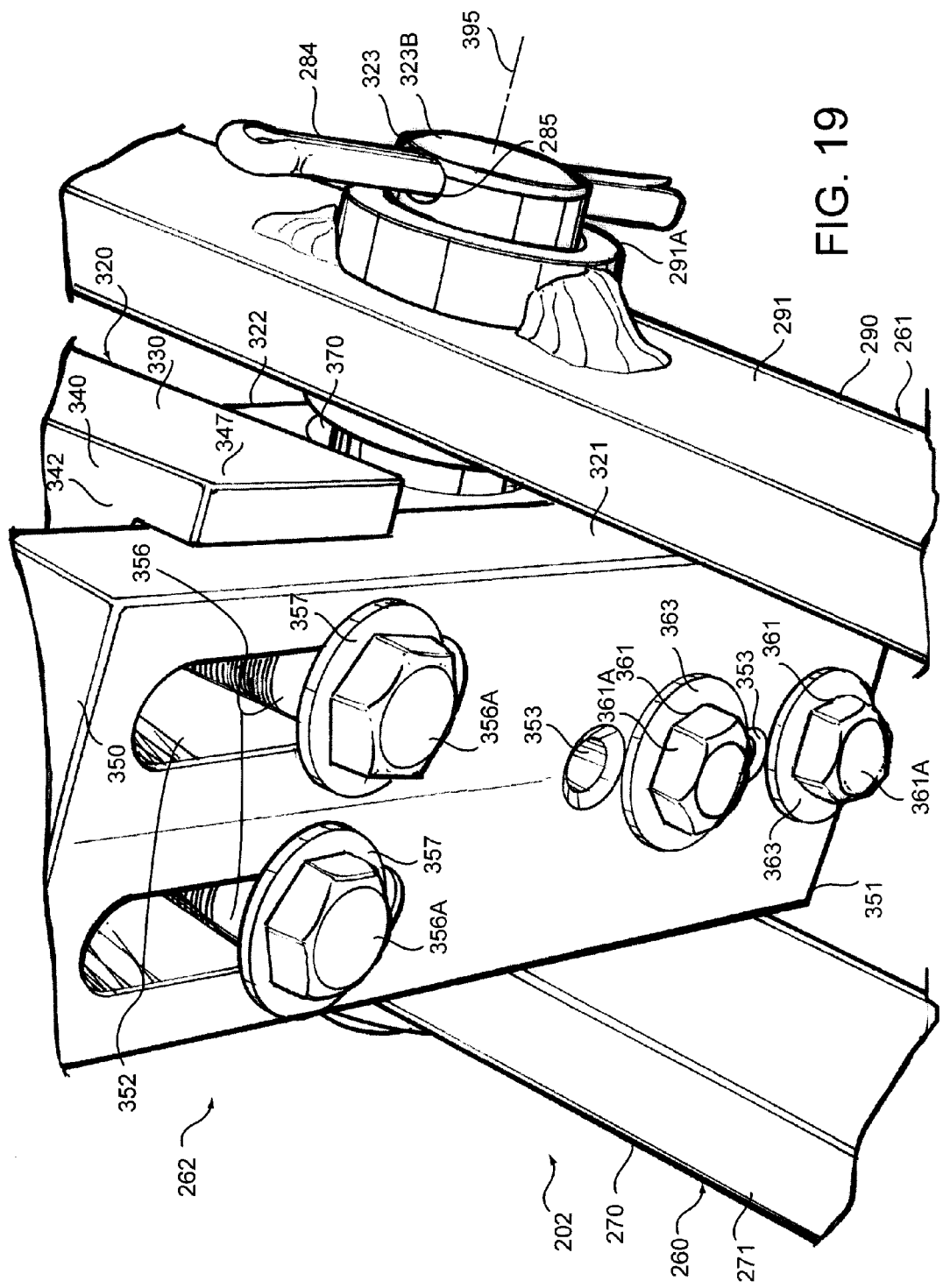
FIG. 19 is an enlarged, fragmented perspective view of a connector assembly of the stabilization apparatus of the vehicle assembly of FIG. 15.

Looking to FIGS. 17 and 19, support fixture 321 has opposed upper and lower ends 350 and 351, a pair of opposed, vertical, parallel, substantially coextensive slots 352 formed therethrough proximate to upper end 350, and, as best seen in FIG. 17, a row of openings 353 formed therethrough extending vertically between lower end 351 and slots 352. Upper end 350 of support fixture 231 is applied against front end 342 of base 330 between extensions 347 as best seen in FIGS. 19 registering slots 352 with threaded openings 344 (FIG. 17) formed in front end 342 of base 330. Threaded fasteners 356, which in this example are threaded bolts, are applied into and through slots 352 and are threadably received by threaded openings 344 (FIG. 17) formed in front end 342 of base 330 and are then rotated and tightened thereby rigidly securing support fixture 321 to front end 342 of base 330. Support fixture 321 extends downwardly with respect to base 330 and frame 210 of bicycle 201 from upper end 350 to lower end 351, which is attached to block 322. As best seen in FIG. 19, washers 357 encircle threaded fasteners 356 and are positioned between heads 356A of fasteners 356 and support fixture 321.

Block 322 is formed with a pair of threaded openings 360 as illustrated in FIG. 17, and is positioned against the back side of support fixture 321 proximate to lower end 351 of support fixture 321 opposing lower face 341 of base 330 as best seen in FIG. 20 registering threaded openings 360 with a corresponding pair of the threaded openings 353 formed in support fixture 321. Threaded fasteners 361, which in this example are threaded bolts, are applied into and through the corresponding pair of openings 353 registered with threaded openings 360 formed in block 322, and are then rotated and tightened thereby rigidly securing support block 32 to support fixture 321 proximate to lower end 351 underneath and in opposition to base 330 thereby suspending block 322 below bottom bracket 253 and frame 210 of bicycle 201 below and underneath lower surface 341 of base 330. As best seen in FIG. 19, washers 363 encircle threaded fasteners 3361 and are positioned between heads 361A of fasteners 361 and support fixture 321. Connector assembly 262 may be readily detached from bicycle 201 by reversing the steps of installing bracket assembly 320 onto bicycle 201 as described above.

A bore or channel 370 is formed through block 322 as shown in FIG. 17, which extends transversely with respect to bicycle 201 from side 210A to side 210B. Axle or member 323 extends into and through channel 370 and is supported in and by channel 270 transversely with respect to bicycle 201 locating end portion 323A proximate to side 210A of bicycle 201 as shown in FIG. 15, and locating opposed end portion 323B proximate to side 210B of bicycle 201 as shown in FIGS. 16, 18, and 20.

As previously disclosed, stabilizer assembly 260 attaches to, and is supported by, end portion 323A of axle 323 along side 210A of bicycle 201 and is supported underneath frame 210 of bicycle 201 as seen in FIG. 15, and stabilizer assembly 261 attaches to, and is supported by, end portion 323B of axle 323 along side 210B of bicycle 201 and is supported underneath frame 210 of bicycle as seen in FIG. 16. Support member 271 is formed with an opening 271A formed therethrough illustrated in FIG. 17, which is positioned at an intermediate position between leading and trailing ends 272 and 273, and which is preferably substantially equidistant with respect to leading and trailing ends 272 and 273. End portion 323A is applied into and through opening 271A and is secured with a pin 280, as illustrated in FIG. 15, that captures support member 271 between end portion 323A and block 322 thereby securing stabilizer assembly 260 to connector assembly 262 secured to frame 210 of bicycle 201 and supporting stabilizer assembly 260 proximate to side 210A of bicycle 201. Pin 280 is received and secured by an opening 281 formed in end portion 323A illustrated in FIG. 17. Support member 291 is formed with an opening 291A formed therethrough as illustrated in FIGS. 17 and 18, which is positioned at an intermediate position between leading and trailing ends 292 and 293, and which is preferably substantially equidistant with respect to leading and trailing ends 292 and 293. End portion 323B is applied into and through opening 291A and is secured with a pin 284 as shown in FIGS. 16 and 19 that captures support member 291 between end portion 32BA and block 322 thereby securing stabilizer assembly 261 to connector assembly 262 secured to frame 210 of bicycle 201 and supporting stabilizer assembly 261 proximate to side 210B of bicycle 201. Pin 284 is received and secured by an opening 285 formed in end portion 323B illustrated in FIGS. 17-19.

Referencing FIGS. 15 and 16 in relevant part, wheeled stabilizer assemblies 260 and 261 are carried by the respective end portions 323A and 323B of axle or member 323 on either side 210A and 210B of frame 210 of bicycle 201 underneath frame 210 of bicycle 201 positioning support assemblies 270 and 290 so as to apply the wheeled ends of stabilizer assemblies 260 and 261 against the ground over which bicycle 201 is driven to permit the wheeled ends of stabilizer assemblies 260 and 261 to wheelingly interact with the ground over which bicycle 201 is driven to stabilize bicycle 201 as bicycle 201 is driven over the ground. As such, wheels 277 and 287 at wheeled ends 278 and 288 of stabilizer assembly 260, wheels 297 and 307 at wheeled ends 298 and 308 of stabilizer assembly 261, and front and rear wheels 235 and 227 of bicycle 201 concurrently roll over the ground over which bicycle 201 is driven such that front and rear wheels 235 and 227 of bicycle 201 operate in the normal manner while wheels 277 and 287 of stabilizer assembly 260 and wheels 297 and 307 of stabilizer assembly 261 are supported against the ground over which bicycle 201 is ridden such that stabilizer assemblies 260 and 261 interact with the ground to stabilize bicycle 201 as it is driven preventing bicycle 201 from tipping over, according to the principle of the invention.

With continuing reference in relevant part to FIGS. 15 and 16, with respect to stabilizer assembly 260, elongate support member 271 is disposed proximate to and extends along side 210A of frame 210 of bicycle 201 from leading end 272 directed toward front wheel 235 of bicycle 201 and trailing end 273 directed toward rear wheel 227, whereby front arm 275 attached to leading end 272 of elongate support member 271 extends outwardly therefrom with respect to elongate support member 271 and side 210A of frame 210 of bicycle 201 to wheeled end 277, which is disposed or otherwise located proximate to and outboard of front wheel 235 of bicycle 201, and rear arm 285 attached to trailing end 273 of elongate support member 271 extends outwardly therefrom with respect to elongate support member 271 and side 210A of frame 210 of bicycle 201 to wheeled end 287, which is disposed proximate to and outboard of rear wheel 227 of bicycle 201. With respect to stabilizer assembly 261, elongate support member 291 is disposed proximate to and extends along side 210B of frame 210 of bicycle 201 from leading end 292 directed toward front wheel 235 of bicycle 201 and trailing end 293 directed toward rear wheel 229, whereby front arm 295 attached to leading end 292 of elongate support member 291 extends outwardly therefrom with respect to elongate support member 291 and side 210B of frame 210 of bicycle 201 to wheeled end 297, which is disposed or otherwise located proximate to and outboard of front wheel 235 of bicycle 201, and rear arm 305 attached to trailing end 293 of elongate support member 291 extends outwardly therefrom with respect to elongate support member 291 and side 210B of frame 210 of bicycle 201 to wheeled end 307, which is disposed proximate to and outboard of rear wheel 229 of bicycle 201.

When mounted to bicycle 201 according to this disclosure, stabilizer assemblies 260 and 261 are the mirror image of one another, and elongate support members 271 and 291 of stabilizer assemblies 260 and 261, respectively, oppose each and are substantially parallel with respect to each other, and are located toward sides 210A and 210B, respectively, of frame 210 and underneath frame 210 so as not to interfere with the normal pedaling action of pedals 251 and crank arms 251, which takes place along the outer side of elongate support members 271 and 291 between the leading ends 272 and 292 of elongate support members 271 and 291, respectively, and trailing ends 273 and 293 of elongate support members 271 and 291, respectively. Moreover, the pedaling action of pedals 251 and crank arms 251 takes place along the outer side of elongate support members 271 and 291 between front arms 275 and 295 of elongate support members 271 and 291, respectively, and rear arms 285 and 305 of elongate support members 271 and 291, respectively. With reference to FIG. 15, front wheel 235 of bicycle 201 rotates about an axis of rotation denoted at 390, rear wheel 227 rotates about an axis of rotation denoted at 391, front or forward stabilizer wheels 278 and 298 of stabilizer assemblies 260 and 261, respectively, are positioned proximate to axis of rotation 390 of front wheel 235, and rear or rearward stabilizer wheels 288 and 308 of stabilizer assemblies 260 and 261, respectively, are positioned proximate to axis of rotation 391 of rear wheel 227.

Of course, in the use of bicycle 201 in its normal manner with apparatus 202 attached thereto as explained in detail and as shown in FIGS. 15 and 16, stabilizer assemblies 260 and 261 are positioned to ensure that support assemblies 270 and 290 are oriented and positioned to ensure that front and rear wheels 235 and 227 of bicycle 201 and the four wheeled ends of stabilizer assemblies 260 and 261 concurrently interact with the ground over which bicycle 201 is driven to permit stabilizer assemblies 260 and 261 of apparatus 202 work in accordance with their intended purpose which is to cooperate together to stabilize bicycle 201 as it is driven over the ground by preventing bicycle 201 from tipping over on one side or the other. And so apparatus 202 is constructed, arranged, and sized to fit onto bicycle 201 to function in this way. The four wheeled ends of stabilizer assemblies 260 and 261 concurrently interact with the ground over which bicycle 201 is driven to form a four-point wheeled footprint that engage against and wheelingly interact with the ground over which bicycle 201 is ridden stabilizing bicycle 201 during the normal use thereof to assist users that are uncoordinated or may suffer from a balance disorder in safely riding bicycle 201.

Apparatus 202 is designed to be removably attached to any bicycle, and bicycles come in different sizes and shapes and have different clearances between the frame and the ground over which the bicycle is ridden. As such, connector assembly 262 is configured to permit adjustment of stabilizer assemblies 260 and 261 between a raised position toward frame 210 as shown in FIG. 22, and a lowered position away from frame 210 as shown in FIG. 24, and this reciprocal movement of stabilizer assemblies 260 and 261 is denoted generally by the double arrowed line C in FIGS. 22 and 24.

Movement of stabilizer assemblies 260 and 261 attached to connector assembly 262 secured to bicycle 201 between raised and lowered positions can be carried out through the adjustment of support fixture 321, which is mounted to base 330 for movement between a raised position toward frame 210 and away from the ground over which bicycle 201 is driven and a lowered position away from frame 210 and toward the ground over which bicycle 201 is driven, the adjustment of block 322, which is mounted to support fixture 321 for movement between a raised position toward frame 210 and away from the ground over which bicycle 201 is driven and a lowered position away from frame 210 and toward the ground over which bicycle 201 is driven, or through the adjustment of both the support fixture 321 and block 322.

Looking to FIG. 21, slots 352 through support fixture 321 are elongate and substantially vertically with respect to the ground over which bicycle 201 is ridden. When threaded fasteners 356 are loosened, support fixture 321 may be moved relative to base 330 between a raised position as shown in FIGS. 21 and 22 locating stabilizer assemblies 260 and 261 secured to member 323 secured to block 322 fastened to support fixture 321 at a raised position, and a lowered position as shown in FIGS. 23 and 24 locating stabilizer assemblies 260 and 261 secured to member 323 secured to block 322 fastened to support fixture 321 at a lowered position. Slots 352 are substantially equal in length, and the amount of travel of support fixture 321 between its raised and lowered positions is limited by the length of slots 352, which limit the travel of threaded fasteners 356 through slots 352 when support fixture 321 is moved between its raised and lowered positions. After support fixture 321 is disposed at a desired location, threaded fasteners 356 are tightened to secure support fixture 321 in place relative to base 330. Of course, movement of support fixture 321 between its raised and lowered positions results in the corresponding movement of axle or member 323 attached to support fixture 321 via block 322 between a raised position of end portions 323A and 323B toward frame 210 of bicycle 201 away from the ground over which bicycle 201 is driven, and a lowered position of end portions 323A away from frame 210 of bicycle 201 toward the ground over which bicycle 201 is driven. With stabilizer assemblies 260 and 261 attached to end portions 323A and 323B, respectively, it is to be understood that this movement of end portions 323A and 323B between raised and lowered positions through the movement of member 323 between raised and lowered positions provides corresponding movement of stabilizer assemblies 260 and 261 between raised and lowered positions.

Looking back to FIG. 17, block 322 that carries member 323 is formed with the pair of threaded openings 360, which are aligned with a corresponding pair of the openings 353 formed into and through support fixture 321 and secured in place with threaded fasteners 361, and this permits movement of block 321 relative to support fixture 321 between a raised position as shown in FIGS. 23 and 24 locating stabilizer assemblies 260 and 261 secured to member 323 secured to block 322 fastened to support fixture 321 at corresponding raised position, and a lowered position as shown in FIGS. 21 and 22 locating stabilizer assemblies 260 and 261 secured to member 323 secured to block 322 fastened to support fixture 321 at a corresponding lowered position. In FIGS. 21 and 22, threaded fasteners 361 are threadably received by threaded openings 360 (FIG. 17) in block 322 securing block 322 to support fixture 321, and threaded fasteners 361 are received in a corresponding lower pair of openings 353 (FIG. 17) in support fixture 321 that corresponds to the lowered position of block 32. In FIGS. 23 and 24, threaded fasteners 361 are threadably received by threaded openings 360 (FIG. 17) in block 322 securing block 322 to support fixture 321, and threaded fasteners 361 are received in a corresponding upper pair of openings 353 (FIG. 17) in support fixture 321 that corresponds to the raised position of block 32. Of course, movement of block 322 between its raised and lowered positions results in the corresponding movement of axle or member 323 carried by block 322 between a raised position of end portions 323A and 323B toward frame 210 of bicycle 201 away from the ground over which bicycle 201 is driven, and a lowered position of end portions 323A away from frame 210 of bicycle 201 toward the ground over which bicycle 201 is driven. With stabilizer assemblies 260 and 261 attached to end portions 323A and 323B, respectively, it is to be understood that this movement of end portions 323A and 323B between raised and lowered positions through the movement of block 322 between raised and lowered positions provides corresponding movement of stabilizer assemblies 260 and 261 between raised and lowered positions.

Looking back in relevant part to FIGS. 15 and 16, axle or member 323 extends transversely with respect to frame 210 of bicycle 201 between front and rear wheels 235 and 227, and defines an axis 395 therethrough from end portion 323A to end portion 323B, which is substantially parallel with respect to axis 390 of rotation of front wheel 235, axis 391 of rotation of rear wheel 227, and axis 253A of rotation of bottom bracket 253 that is located above and that opposes axis 395 of axle or member 323. Axis 253A and axis 395 reside in a substantially vertical plane with respect to the length of bicycle 201 from its front end to its rear end. Support assembly 270 held by end portion 323A of axle or member 323 is free to pivot about axis 395 of axle or member 323 to permit stabilizer assembly 260 to freely pivotally displace as needed as bicycle 201 as driven over the ground. Support assembly 290 held by end portion 323B of axle or member 323 is, like support assembly 270, free to pivot about axis 395 of axle or member 323 to permit stabilizer assembly 261, like stabilizer assembly 260, to freely pivotally displace as needed as bicycle 201 is driven over the ground. Preferably, there is sufficient clearance between end portion 323A of axle or member 323 and opening 271A (FIG. 17) formed in support assembly 270 through which end portion 323A is received to permit the pivotal movement of stabilizer assembly 260 with respect to end portion 323A of axle or member 323. Likewise, there is preferably sufficient clearance between end portion 323B of axle or member 323 and opening 291A (FIG. 17) formed in support assembly 290 through which end portion 323B is received to permit the pivotal movement of stabilizer assembly 261 with respect to end portion 323B of axle or member 323.

The invention has been described above with reference to preferred embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. A vehicle assembly, comprising:
   a vehicle including a frame having opposed first and second sides, opposed front and rear ends, and a front wheel mounted for rotation to the frame proximate to the front end of the frame positioned in front of an opposed rear wheel mounted for rotation to the frame proximate to the rear end of the frame and that is substantially in-line with respect to the front wheel;
   a first forward stabilizer and a first rearward stabilizer each mounted to a first support assembly mounted to the frame;
   the first support assembly supporting the first forward stabilizer along the first side of the frame proximate to, and outboard of, the front wheel of the vehicle, and supporting the first rearward stabilizer along the first side of the frame proximate to, and outboard of, the rear wheel of the vehicle;
   a second forward stabilizer and a second rearward stabilizer each mounted to a second support assembly mounted to the frame;
   the second support assembly supporting the second forward stabilizer along the second side of the frame proximate to, and outboard of, the front wheel of the vehicle so as to oppose the first forward stabilizer, and supporting the second rearward stabilizer along the second side of the frame proximate to, and outboard of, the rear wheel of the vehicle so as to oppose the first rearward stabilizer;
   the first and second forward stabilizers positioned to interact with the ground over which the vehicle is driven, along the first and second sides of the frame proximate to the front wheel of the vehicle, to stabilize the vehicle proximate to the front end of the frame of the vehicle; and
   the first and second rearward stabilizers positioned to interact with the ground over which the vehicle is driven, along the first and second sides of the frame proximate to the rear wheel of the vehicle, to stabilize the vehicle proximate to the rear end of the frame of the vehicle.

2. The vehicle assembly according to claim 1, wherein:
   the front wheel rotates about a first axis of rotation;
   the rear wheel rotates about a second axis of rotation;
   the first and second forward stabilizers are positioned proximate to the first axis of rotation of the front wheel; and
   the first and second rearward stabilizers are positioned proximate to the second axis of rotation of the rear wheel.

3. The vehicle assembly according to claim 1, wherein the first forward stabilizer is substantially in-line with respect to the first rearward stabilizer.

4. The vehicle assembly according to claim 1, wherein the second forward stabilizer is substantially in-line with respect to the second rearward stabilizer.

5. The vehicle assembly according to claim 1, wherein the first support assembly is further mounted to the frame for pivotal movement.

6. The vehicle assembly according to claim 1, wherein the second support assembly is further mounted to the frame for pivotal movement.

7. The vehicle assembly according to claim 1, wherein the first forward and rearward stabilizers are each mounted to the first support assembly for swiveling movement.

8. The vehicle assembly according to claim 1, wherein the second forward and rearward stabilizers are each mounted to the second support assembly for swiveling movement.

9. A vehicle assembly, comprising:
a two-wheeled vehicle including a frame having opposed first and second sides, opposed front and rear ends, and a front wheel mounted for rotation to the frame proximate to the front end of the frame positioned in front of an opposed rear wheel mounted for rotation to the frame proximate to the rear end of the frame and that is substantially in-line with respect to the front wheel; and
first and second stabilizer assemblies positioned along the first and second sides, respectively, of the frame to interact with the ground over which the vehicle is driven, the first and second stabilizer assemblies extending along the first and second sides of the frame proximate to the front and rear wheels of the vehicle, to stabilize the vehicle as the vehicle is driven over the ground, wherein the first and second stabilizer assemblies each include an elongate framework assembly mounted to the frame, and having an attached forward stabilizer disposed proximate to, and outboard of, the front wheel of the vehicle and an attached rearward stabilizer disposed proximate to, and outboard of, the rear wheel of the vehicle.

10. The vehicle assembly according to claim 9, wherein the forward stabilizer is substantially in-line with respect to the rearward stabilizer in each of the first and second stabilizer assemblies.

* * * * *